INVENTOR.
GEORGE R. LEGHORN
BY
-ATTORNEY-

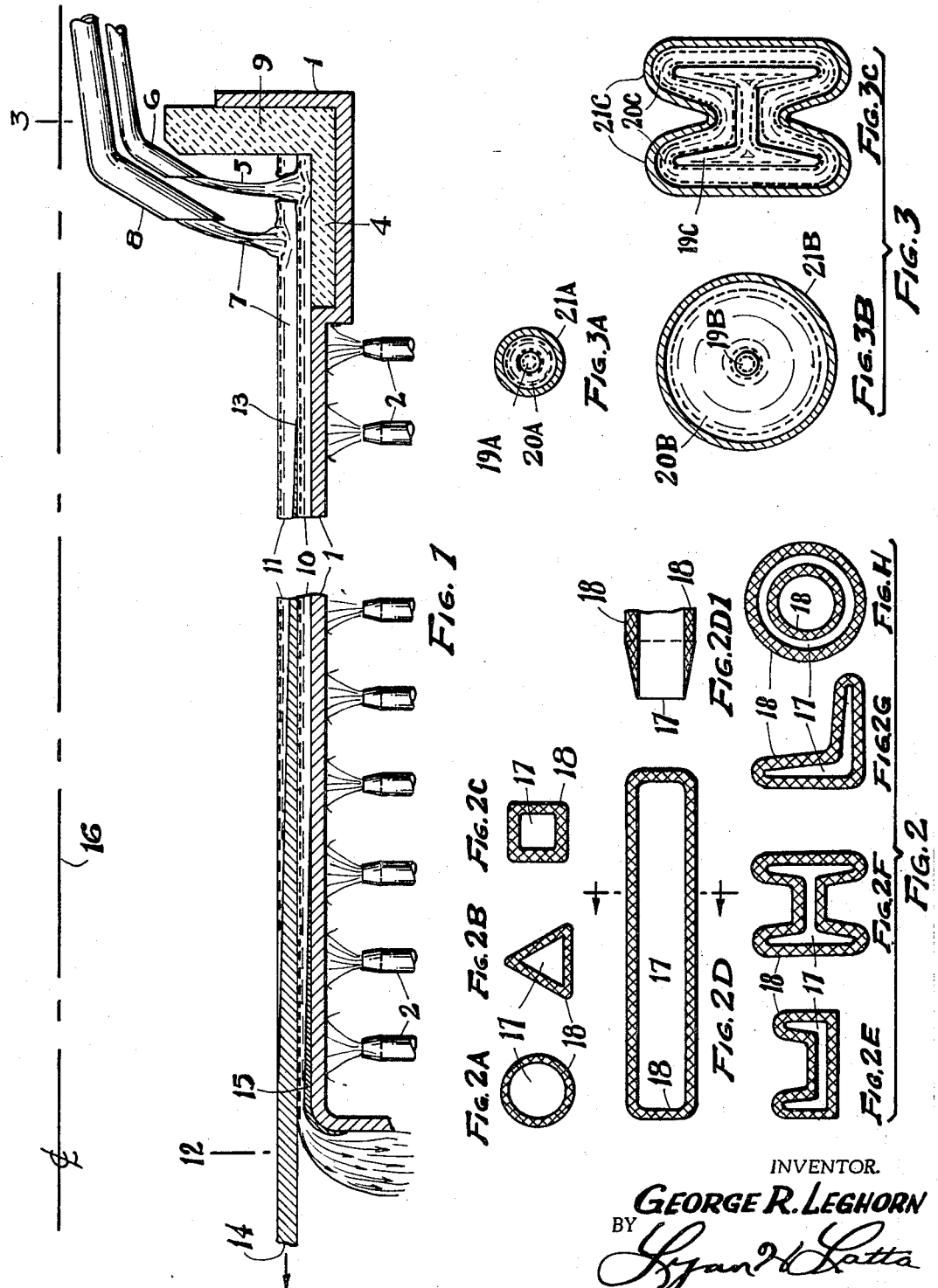

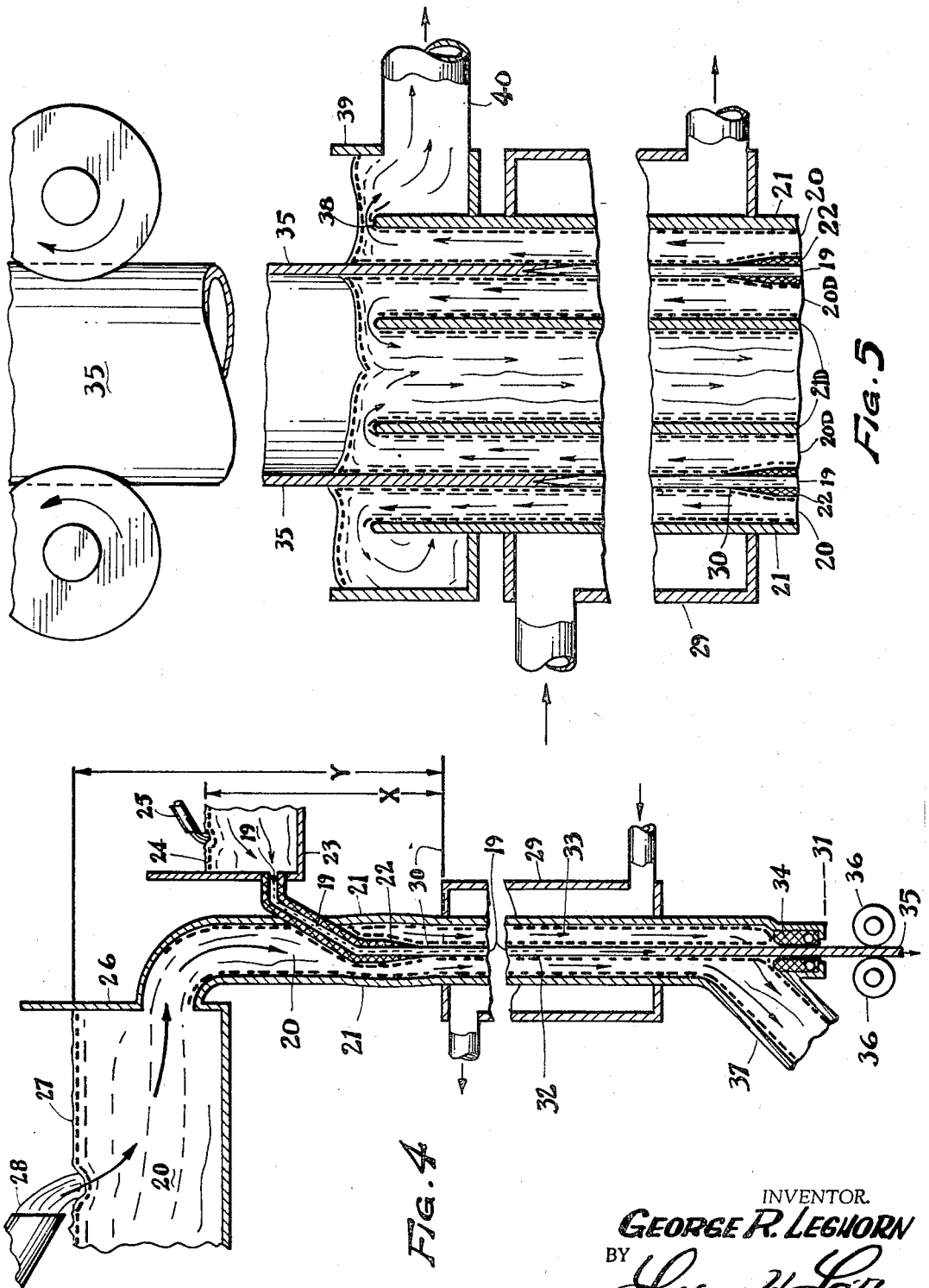

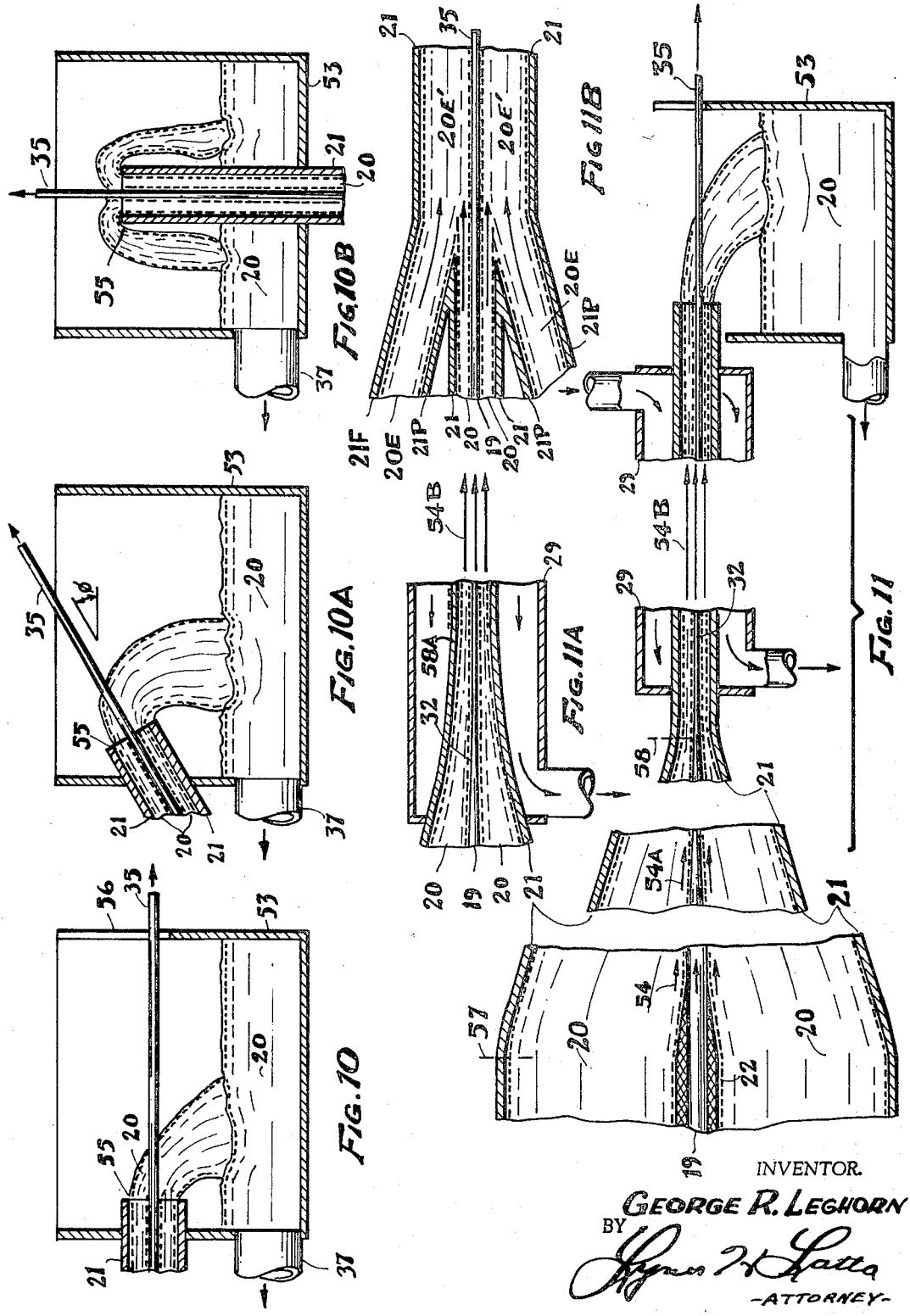

March 4, 1969  G. R. LEGHORN  3,430,680
METHOD OF FORMING STRUCTURAL SHAPES FROM
MOLTEN MATERIAL BY STREAM CASTING
Filed June 16, 1966  Sheet 5 of 8

INVENTOR.
GEORGE R. LEGHORN
BY
-ATTORNEY-

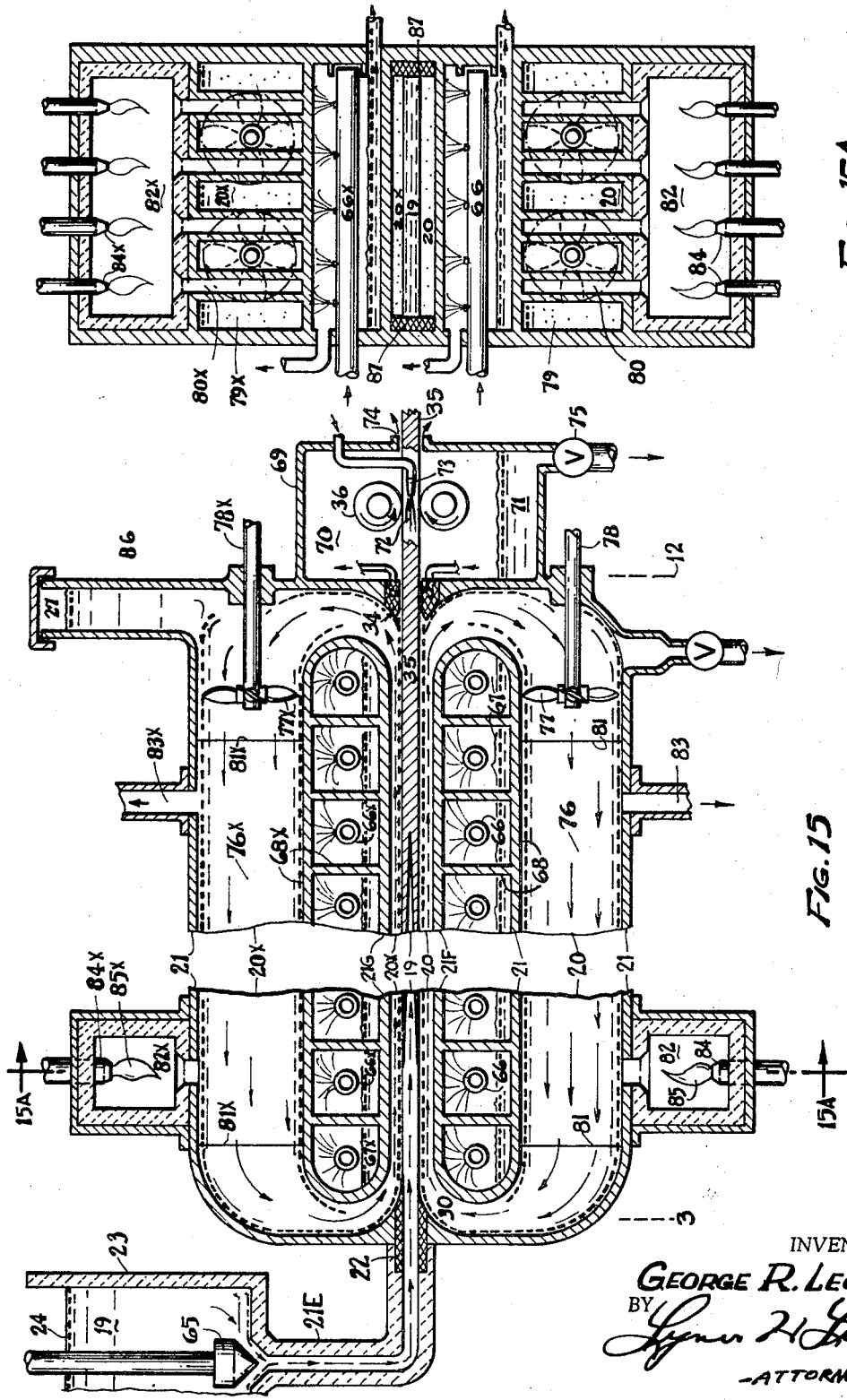

INVENTOR.
GEORGE R. LEGHORN
BY
—ATTORNEY—

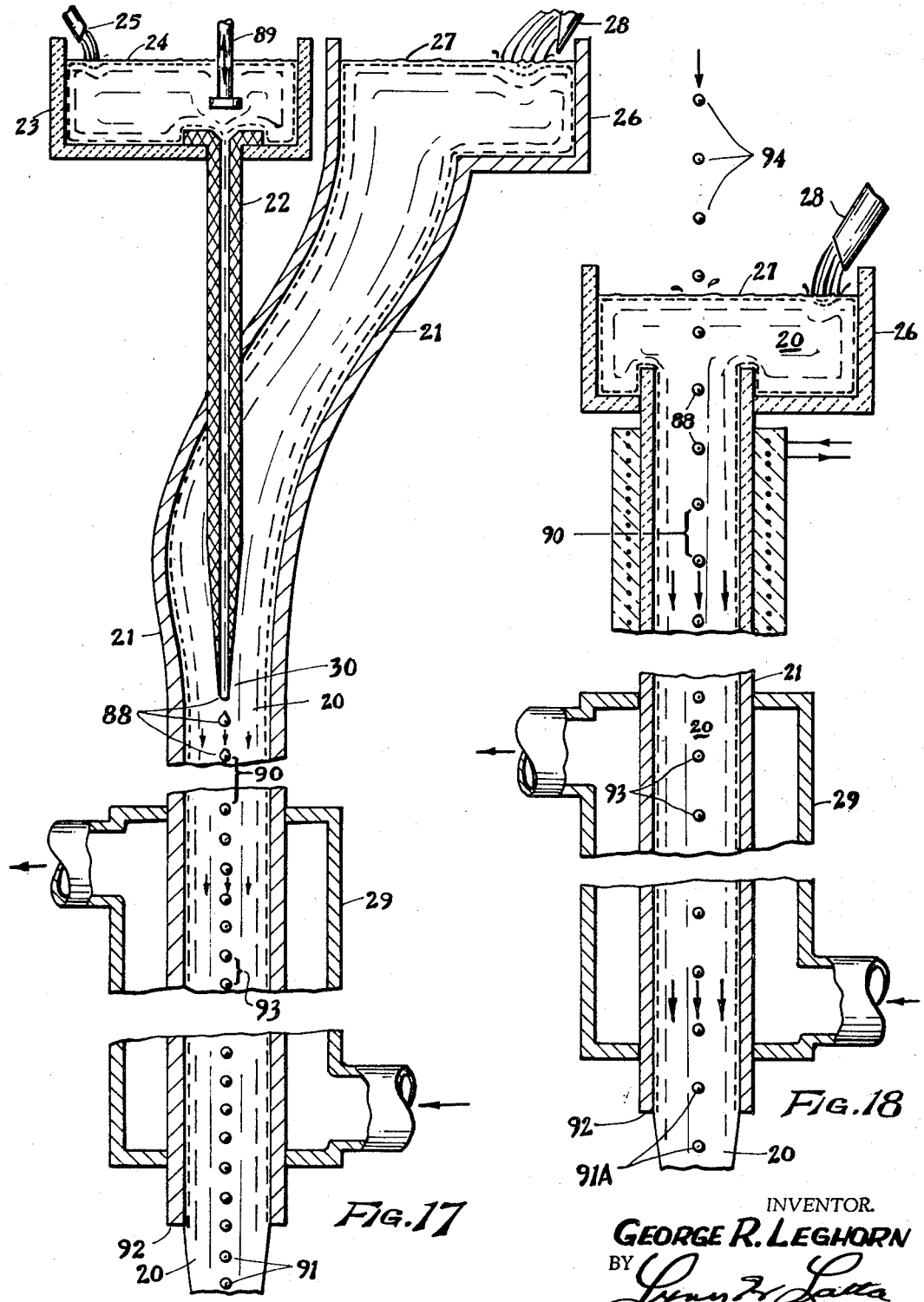

United States Patent Office 3,430,680
Patented Mar. 4, 1969

3,430,680
METHOD OF FORMING STRUCTURAL SHAPES FROM MOLTEN MATERIAL BY STREAM CASTING
George R. Leghorn, Apt. E., 1027 20th St., Santa Monica, Calif. 90403
Continuation-in-part of application Ser. No. 538,506, Feb. 11, 1966. This application June 16, 1966, Ser. No. 557,968
U.S. Cl. 164—81                        4 Claims
Int. Cl. B22d 23/00, 13/00; B22c 13/08

ABSTRACT OF THE DISCLOSURE

In general, the disclosure is of a continuous casting method whereby a selected metal shape is stream cast by flowing a stream of molten metal in heat-transfer contact with one or more streams of a cooling liquid mold material flowing in the same direction and substantially synchronously with the casting metal, the cooling liquid functioning as a mold for imparting the selected cross-sectional shape to the member that is cast from the molten metal. The flowing stream of liquid mold material may be of tubular form (for shaping the external surface of a tube or rod) or of columnar form (for shaping the interior of a tube) or may comprise a flat stream or a pair of layered, spaced flat streams (for shaping one or both faces of a plate or sheet or foil structure). Cross sectional shape of the metal member to be formed may be determined by the shape of an orifice from which the molten metal is streamed.

---

For the principal purposes disclosed, the flows of liquid mold material and molten casting metal are synchronized to avoid shearing action at their contacting interfaces. For specific purposes such as thinning or severing the stream of casting metal into discrete lengths, however, the disclosure is of the use of differential flows (e.g. with the liquid mold flow overrunning the flow of casting metal).

CROSS REFERENCE

This application is a continuation-in-part of my prior application Ser. No. 538,506, filed Feb. 11, 1966, for Continuous Casting and Forming Method and Apparatus.

The invention relates to methods and apparatus for the continuous casting of structural shapes (such as wire, rod, tubing, I-beam, channel, pipe, spheres, etc.) directly from molten metal. The invention utilizes liquid molds in an advanced form which greatly extends the method, quality, and diversity of product output.

BACKGROUND OF INVENTION

Liquid molds have previously been utilized in various inventions and are best exemplified by U.S. Patent 2,298,348 issued to Charles D. Coxe, U.S. Patent 1,831,-310 issued to L. B. Lindemuth, and U.S. Patent 2,754,559 issued to H. A. Fromson. In all of these inventions, the molten metal to be cast is poured onto the surface of a heavier, cooler liquid material to which it is substantially immiscible and nonreactive. The metal to be cast spreads over the surface of the liquid mold material and solidifies thereon to a sheet or plate or, in the case of Lindemuth's invention, to a hollow cylinder. In all of these inventions, the liquid mold is static and the metal to be cast floats and spreads out on the surface of the liquid mold or between the interfaces of a heavier and a lighter liquid mold material. Such liquid molds restrict the end product to a planar (as sheet) or cylindrical form (as pipe).

One drawback to these processes results from the molten metal (to be cast on the liquid surface or interface) spreading or being drawn over the surface of the static liquid mold material. Cast-in surface defects such as tears, seams, wrinkles, laps and folds can result from the shearing action at the interface of the casting metal and liquid mold as one moves over the other. Another more serious drawback results when the liquid mold and the molten metal being cast are mutually soluble or have a solubility of one in the other to an even slight extent. In this instance, the shearing action at the static liquid mold-molten metal interface causes rapid contamination of either the liquid mold material, the metal to be cast, or both due to intermixing. As one illustrative example, copper has a solubility in liquid lead even at low temperatures and, at elevated temperatures, liquid lead and molten copper are entirely soluble one in the other. It can be demonstrated that molten copper can be solidified on a mold surface of cool liquid lead with a minimum of difficulty provided that no relative movement occurs at the liquid mold (lead)-molten metal (copper) interface to cause detrimental intermixing of the two liquids. On the other hand, the movement of molten or solidifying copper over the surface of a static liquid mold of hot or cool lead causes serious and detrimental surface contamination of the copper so cast to solid form, and, also, dissolving of the copper into the liquid lead.

A large number of liquid mold-molten metal phase systems (similar to the lead-copper phase system) exist and, in all of these, serious intermixing at the liquid mold-molten metal interface occurs due to such shearing action and the resultant interface turbulence. Such detrimental aspects can be greatly reduced or obviated by reducing or eliminating the relative motion between the liquid mold and the molten metal at their contact interface.

Another variation of the fluid mold technique concerns the formation of shot or spheroids by solidification of drops of the metal to be cast during its descent through a less dense mold liquid or gas or its ascent through a denser mold liquid. Such inventions are exemplified by the Coxe Patent 2,298,348 and by U.S. Patents 83,152, 1,393,383, 2,952,868, and 3,063,099. In these instances, the molten metal to be cast passes through a static liquid coolant and the end product is a slightly spheroidal pellet.

Another invention, U.S. Patent 2,076,798 issued to C. P. Teeple, casts strings of molten metal into a static liquid coolant whereupon the molten streamed metal solidifies into shreds or continuous but highly irregular threads which are used for journal packing.

In all of the foregoing examples, the liquid mold material is static and the metal to be cast is drawn across the surface of the liquid mold or passes through the body of the liquid mold. In all cases, this creates a resistance to the flow of the solidifying metal to be cast and, in the case of molten metal passing through the body of the liquid mold material, causes disturbances which break up (or render uneven) the stream of molten metal (to be cast) into a substantially spheroidal (not perfectly spherical) form.

Numerous examples of liquid mold materials are listed in the patents mentioned. However, only in Patent 2,076,-798 is water used as liquid mold material and, in this instance, the water is statically held in a catch basin wherein are dropped the liquid shreds (or threads) of metal to be solidified. There are other published technical articles wherein molten metal is streamed into and through a water bath but in all such instances the molten metal is caught and solidified inside of a solid mold immersed within the water bath. One such technical item entitled "Casting Aluminum Ingots Under Water" appeared on page 174 of the October 1958, issue of "Metal Progress." In another publication, U.S. Patent 379,137 issued to D. C. Stover, molten iron or steel is poured along with and through a mass of water and solidifies within the confines of a solid walled mold immersed in the flowing water. In these instances the molds are of a solid wall nature and the water in which the solid molds are immersed acts as a coolant.

My invention is a continuation in part of my prior invention, as disclosed in the aforesaid application Ser. No. 538,506, inasmuch as it extends the use of dynamic (moving) liquid molds to other processes wherein it has not previously been applied.

In the prior invention of said application Ser. No. 538,506, a hollow cylinder (such as steel, copper, aluminum, etc.) is centrifugally cast onto the surface of a centrifuging liquid mold of a denser, nonreactive and relatively immiscible material (such as lead, bismuth, silver, cadmium, etc.) the boiling point of which must be higher than the melting point of the molten metal to be cast thereon and is solidified thereon by heat extraction by or through the liquid mold and water-cooled outer containing wall, said liquid mold lining being of any desired thickness, and varying from a mere lubricating film to a thick flowing stream, but with narrower layer thicknesses preferred due to their lower resistance to heat passage to the outer water-cooled, containing shell of the centrifugal casting apparatus.

In the prior invention for continuously casting tube, both the liquid mold material and molten metal to be cast are continuously poured into the entrance end of the centrifugal mold and move parallel to the longitudinal axis of the centrifuge and out of the exit end. The flowing molten metal, which has solidified on the surface of the flowing layered cylinder of liquid mold material, exits from the outlet end of the centrifugal mold as a solid cylindrical tube (or a solid cylindrical shell containing an inner molten metal layer) while the still liquid mold material exists into a suitable catch basin for recirculation (via a cooler or heat exchanger) through the continuous casting machine.

DESCRIPTION OF INVENTION

It is an object of the present invention to continuously stream cast planar structural forms by solidifying molten metal (in whole or in part) onto the surface of, beneath the surface of, between the interfaces of, or within the body of a cooling liquid mold material (or materials) while both the molten metal being cast and the liquid, heat-abstracting mold material(s) flow in the same direction and at a synchronized rate of laminar flow that minimizes any shearing action at the liquid mold-molten metal interface(s).

As will be illustrated later, the flow rate of the liquid mold is not always uniform (as in my apparatus for continuously casting tube onto a flowing centrifuged liquid mold). In this, and other such instances, the flow rate of the liquid mold is adjusted so that the relative interface motion between the liquid mold and molten metal is minimized at the critical area. Such a critical area exists where the molten metal first begins to form a thin solidified shell at the cooling interface.

It is a further object of this invention to continuously cast longitudinal (and other) structural shapes (such as wire, rod, bar, sheet, plate, I-beam, channel, pipe, angles, tubes, spheres, etc.) by streaming the molten metal (to be cast) from an orifice, having the cross-sectional shape of the desired end item, along with a surrounding body of cooling liquid mold material which is streaming in the same direction and at the same approximate rate of laminar flow.

It is an additional object to prevent any billowing outward or inward of the molten metal being so cast by maintaining substantially equal pressures within the flowing liquid mold material and the molten metal to be cast until a form retaining skin of solidified metal has formed on the surface of the structure being so cast.

Another object of the invention is to prevent distortion of the continuously cast structure so produced by maintaining a laminar (non-turbulent) flow of both the longitudinal structural metal being cast and the surrounding liquid mold material (which contains the molten metal structural form and abstracts heat therefrom) and freezing the structure to the desired solid shape while continuously and smoothly flowing in the same direction.

Another object of the invention is to stream structural forms vertically downward along with a cooling, surrounding liquid mold material of less or equal density such as water, solutions of water and suitable solutes, Dowtherm A, glycerine, silicones, salts, molten hydroxides, molten glasses, and molten metals or alloys thereof. In this instance, once a structurally sound solid shell has been formed on the metal shape being cast (as wire, sheet, etc.), the cast item is flexed upward by suitable guides or directed jets and exited from the liquid mold surface for further processing or use or it is drawn through a special, novel, die orifice at the bottom of the containing conduit (where the conduit turns to the side).

It is, therefore, a further object to use a special, water-cooled, exit die wherein the liquid mold material solidifies on the cold faces of the die orifice and builds up a layer of the mold material that substantially restricts passage therethrough of nearly all but the solidified metal structure which has been stream cast. Such liquid mold materials are very soft (as lead, indium, silver, bismuth, tin and alloys thereof as well as the alkali and alkaline metals either alone or in combination with any of the foregoing). Also, solidified layers of molten salts or hydroxides are quite brittle and fragile; thus, any inadvertent oversize in the stream cast structure will shear away the solidified layer of previously liquid mold material so that jamming does not occur. At the same time, where such shearing away does occur, the layer is quickly resolidified. In this manner, the restrictive orifice is self-healing. It should be noted that this type of orifice is used on all other exit dies for the systems disclosed in this invention whether of a vertical (down-streaming) or horizontal streaming nature.

Another object is to obviate a prior restriction on liquid mold-molten metal systems. In all other systems known to the art, the boiling point of the liquid mold material must be lower than the pouring temperature of the molten metal being statically cast thereon or therein. By using a dynamic liquid mold, a great many thinner walled structures can be cast within a moving liquid mold, the boiling point of which is lower than the pouring temperature of the molten metal being so stream-cast. This is especially true where one or more of the low boiling alkali or alkaline metals is alloyed with a higher boiling, low melting point material (such as lead, indium, bismuth, silver, antimony, tin, etc. or mixtures thereof).

Another object is to stream structural forms (especially those with a hollow configuration, as tube) vertically upward along with a cooling, surrounding, liquid mold material of greater or equal density, such as molten hydroxides, molten salts and molten metals (as lead, bismuth, tin, antimony, cadmium, indium, silver and alloys thereof with themselves or the alkali or alkaline earth metals). In this instance, once the desired length of the structural item has exited and been pulled above the surface of the liquid mold, it is cut off for further processing or use.

A further object, in the stream casting of structural, hollow forms vertically upward, is to reduce the thickness of the liquid mold material (external to the freeze-formed hollow shell which is drawn upwardly) to a mere lubricating film of highly heat conductive liquid metal so that the highly heat conductive liquid mold metal fills the interspace (gap) between the outside of the freeze-formed hollow structure (shell) and the inside of the water-cooled external conduit so that continued heat abstraction from the solidifying hollow structure takes place thus permitting greater wall thicknesses to be attained in the structure so cast.

Still another object is to utilize molten, de-watered hydroxides (such as the hydroxides of sodium, potassium, lithium, strontium, etc.) as liquid mold materials. In this instance, the molten metal will stream on top of, or underneath, or within the body of the molten liquid hydroxide depending on the relative densities of the molten metal and liquid hydroxide mold and the stream casting process being utilized.

A further object is to use molten salts and hydroxides (and mixtures thereof), along with substantial additions of water thereto, for the purpose of producing liquid mold materials having lower melting points, greater fluidity, and enhanced cooling characteristics. Such phases (with water additions) exemplify those novel systems wherein a material (which has a much lower boiling point than the temperature of the molten metal being stream-cast) is admixed with materials (having higher boiling points) to form liquid mold materials which have excellent heat stability. Very substantial additions of water can be maintained in such liquid mold materials and remain stable at processing temperatures far above the boiling point of the water component. Such water additions are readily made by passing live steam through the molten materials until the desired amount of water has been absorbed therein. Also, such water additions are readily controlled and measured by use of a suitably refractory hydrometer.

Still another object is the improvement of molten metal exit orifice nozzles, of the various cross-sectional designs used in this invention, by fabricating such nozzles of pyrolytic materials (such as pyrolytic graphite, pyrolytic boron nitride or grafoil-pyrolytic graphite tape) so as to obviate freezing and clogging at the exit tips of the nozzles, such pyrolytic materials to have the A-axis (the direction of exceptionally high heat conductivity) aligned with the direction of streaming and the exit end of the nozzle's wall to be beveled to a feather edge, said bevel to be slanted towards the hotter molten metal being steam-cast.

Another object is to stream such structural molten metal forms horizontally (or at an incline to the horizontal) along with a cooling, surrounding liquid mold material of approximately the same density as the molten metal being cast. In this instance, the solidified inclined shape can exit from the surface of the liquid mold for cutoff into suitable lengths.

It is a further object to cast very thin items (such as wire, foil, and other longitudinal structures) by the expedient of using a liquid mold material at a temperature above the melting point of the metal (to be laminarly streamed within the confines of the moving liquid mold material) so that both the liquid mold and shaped metal structure (as molten metal wire) remain liquid for a desired processing period. The solid conduit which confines the liquid mold material and the encompassed molten metal structure is then gradually reduced in size along its length so that the liquid mold and metal structure are drawn out to a much smaller dimension as they pass with laminar flow down the continually narrowing confining conduit. Previous to the exit end of the narrowed conduit, the entire mass (liquid mold and encompassed molten metal structure) is then cooled below the freezing point of the metal to be cast but above the melting point of the liquid mold. In this manner, the molten metal structure (as wire, foil, or other thin structure) is drawn out to a very thin stream and is frozen into a thin solid structural form of any desired thinness. Such structures (as wires) which have been drawn (thinned) out in the liquid state and during incipient nucleation have higher strengths and greater integrity when wires solidified from the original, thicker, flowing metal stream.

Still another object is to form continuous or discontinuous fine structures (as wire, foil, etc.) of stream-cast metal. Where wire is the structure so formed, it is used in making wire filters and other matted wire products. This object is accomplished by flowing a stream of molten metal of sheet form, or round (or other, as triangular) cross-section, centrally into a stream of immiscible, liquid mold material flowing at a much greater rate of speed and in the same direction as the streamed molten metal so that the faster flowing liquid mold material pulls the encompassed stream of molten metal into fine films, threads, or wires prior to their breakup and solidification into discontinuous entities. Continuous wires and foils are formed when the greater rate of flow of the liquid mold material exerts insufficient shearing action to tear the structure into discrete entities. Such a system can use a hot (above the melting point of the molten metal being streamed inside the liquid mold) liquid mold material, which is subsequently cooled to a temperature below the freezing point of the entrained discontinuous or continuous thin structure, or cold liquid mold material (temperature well below the melting point of the molten metal being streamed) which freezes the streamed and drawn out molten metal with great rapidity. In the first instance, discontinuous wires so formed are relatively smooth and have rounded ends. In the second case (cold liquid mold material), the discontinuous wires have a rougher, serrated surface and are tipped at the ends. Both end products have distinct virtues when used to make compressed metal fiber matte structures. The wires with rough serrated surfaces are preferred for use in scouring pads.

Another object is to form fine fluted, discontinuous wires (of a triangular or polygon cross-section) the edges of which are cusps having exceptional abrading properties.

Another object is to pass the molten metal (to be cast to a solid structure within a subsequent flowing liquid mold) down a tapered cone nozzle so that the molten metal is accelerated towards the shaped exit orifice of the nozzle. In this manner, any liquid nonmetallic inclusions are elongated and drawn out to a thread form which, when solidified, are less harmful to the integrity of the structures so cast in the cooling liquid mold.

Another object is the down-stream introduction (to the stream casting systems disclosed herein) of additional liquid mold material (either hotter or colder than the equalized temperature of the initial, up-stream, liquid mold material) so that the final equilibrium temperature, of the added liquid mold materials and the solid stream-cast structure, is at some specifically desired temperature which permits transformation of the stream-cast item (as wire, etc.) to a desired metallurgical phase or microstructure which enhances subsequent processing such as heat-treating, wire drawing, ausforming, and the like. The down-stream addition of a large amount of cold liquid mold material may also be used, in lieu of a water-cooling jacket, to solidify the stream structure.

Still another object is the design of a machine, for the continuous stream casting of sheet, plate, or a multiplicity of structural objects (side by side) as a horizontal layer (as wires, rods, and preforms of I-beam, channel, etc.), encompassing the teachings herein disclosed. Said continuous casting machine includes two flowing loops of liquid mold material which come together (at the entrance end) to enclose the streamed molten metal structural shape (or shapes), flow along and in synchronization with the molten metal structure(s) until they are substantially solidified, and then diverge from the solidified structure(s) (prior to the exit of the structure(s) from the machine) so that the loops of liquid mold material passes through suitable coolers prior to reintroduction at the entrance end of the continuous casting machine.

A still further object is to utilize the continuous stream casting machine by incorporating a modified process wherein one (either upper or lower) of the two loops of liquid mold material is replaced by a loop of the molten metal to be stream-cast (in part) to a solid, planar structure.

A further object is to manufacture metal spheres of a highly spherical nature by flowing a round stream of molten metal into the center of a liquid mold flowing at the same speed, wherein the temperature of the liquid mold material is above the melting point of the molten metal stream encompassed therein, and to break the molten metal stream into uniformly sized droplets by the technique of superimposing a vibration of predetermined frequency in accordance with the teachings of U.S. Patent 2,510,574, issued to C. W. Greenhalgh. The flowing liquid mold containing a multiplicity of uniformly sized liquid spheres is then cooled to a temperature below the freezing point of the solidified metal so as to form the solid metal spheres.

A further object is to manufacture metal spheres of high melting point metals (such as steel and steel alloys—bearing steels, cobalt and cobalt alloys, nickel and nickel alloys, and combination alloys of these and other metals) in such a manner that they have such exceptional sphericity and uniformity of size that they can be used for the ball points of pens or as ball bearings (from large sizes down to and including miniature bearings). The technique involves reducing solid metal shapes (such as pellets, punchings, clipped wires, etc.) to a specific weight that is accurate to ±0.001 of the actual weight of the sphere (bearing) to be manufactured. Such pellets of a very accurate weight are introduced into a flowing liquid mold (of the same density as the pellet in its just molten state) which is at a temperature above the melting point of the metal to be changed to spherical form. The mold, in this conception, is not static as in all other prior art but moves in any desired direction (up, down, horizontal, or slantwise) along with and in the same direction as the contained (now molten) drop of metal being changed to a nearly perfect sphere by the action of liquid surface tension. Once such sphericity is attained, the liquid mold (with its contained molten metal spheres) flows into a cooling zone wherein the entire liquid mold and molten sphere contents are cooled to a lower temperature, where the mold is still liquid while the metal spheres are frozen solid, but at a sufficiently elevated temperature that the metal spheres are responsive to heat treatment by known heat treating processes. The liquid mold and contained solid spheres then pours into a quench bath for heat treatments as hardening, austempering, or martempering as desired.

Accordingly, it is another object of this invention to heat treat such precision spheres while they are encompassed by the liquid and solidified mold material so as to decrease any distortion (usually occurring during such heat treatment) and to prevent damage to the surface finish thereof during such treatment.

Another object is to stream-cast nonmetallic inorganic materials of a castable nature from the groups comprising glasses, oxides, carbides, nitrides, silicides, borides, phosphides, sulphides, and combinations thereof into longitudinal and discontinuous structural shapes by the methods of this disclosure wherein the encompassing liquid mold materials used would compromise those high boiling point metals or alloy combinations thereof selected from the following group: lead, silver, tin, copper, cobalt, nickel, and the noble metals; the choice of said liquid mold material being dependent on the relative immiscibility with and non-reactiveness to the non-metallic inorganic material being so stream-cast.

A final object is the use and design of liquid mold materials which will have approximately the same density as that of the molten metal to be stream-cast by the foregoing processes.

My invention departs from the teachings of the prior art in utilizing dynamic molds instead of the static liquid molds previously used. The molds of this invention have been made dynamic inasmuch as both the liquid mold and molten metal objects to be solidified thereon or therein move in substantially synchronous laminar flow and in the same direction. Such innovation over the prior art results in a superior surface finish in the product being continuously cast and obviates the shearing action at the liquid mold-molten and solidified metal interface which causes interface turbulence and detrimental mixing of the liquid mold and molten metal materials. By this departure, the range of application (compatibility) of liquid molds versus molten metals to be continuously cast are greatly extended (greater solubility ranges permissible).

Such laminar, and substantially synchronized flow of the liquid mold-molten metal shape permits a still greater departure from prior practice inasmuch as it permits longitudinal shapes of any desired structural cross-section (as foil, sheet, plate, tube, I-beam, channel, wire, rod, angle, etc.) to be continuously cast whereas the prior art, using static liquid mold, limited such structural products to flatware (as sheet), cylinders, highly imperfect strings, and discontinuous granules or relatively imperfect spheroids. By the avoidance of turbulence and the unequal forces caused by a drop of molten metal, to be cast, descending or ascending through a static liquid mold material, spheres of a perfection sufficient for use as ball bearings can readily be made.

Previously, the introduction of a molten metal into the body (center) of a static liquid mold material has resulted in the breaking up of the stream of molten metal into shreds, granules or relatively imperfect spheroids or, where strands were formed, of such irregular cross-section as to be useless for wire. By using a substantially synchronized, dynamic, liquid mold, a longitudinal stream of molten metal (of any desired cross-section or shape) can be introduced into the body (instead of on the surface only) of the liquid mold and will solidify therein to the desired longitudinal structural item in a continuous manner.

A still further departure from the prior art is in using liquid molds of the same or approximate density as the molten metal to be cast whereas, in all of the prior art, the use of liquid molds of substantially greater or less density than the molten metal to be cast, has been mandatory since, in all cases, one is required to float on the other or rise or descend within the other. The equal density liquid mold used in my invention permits the structure (to be cast) to flow in any desired direction (up, down, sideways, etc.) with the attendant advantage of choice of entrance and exit position. A more important advantage derives from the fact that, where the liquid mold and molten metal structure are of equal density, one phase will not push into the other due to its greater density or sink or rise in the other. Much greater dimensional and configuration stability results.

Another departure from prior practice is in using liquid mold materials having boiling points which are lower than the melting points of the molten metals being stream-cast therewith. Such use of low boiling liquid mold materials are of advantageous use in the specific and novel systems disclosed herein.

A novel addition to the prior art is derived from the use of molten de-watered hydroxides (by themselves or as mixtures) as some of the liquid mold material(s) used in the stream casting processes herein disclosed. Such liquid mold materials have great advantages for heat abstraction due to their low melting points, high fluidity and reasonably good thermal characteristics.

A further novel addition to the prior art derives from the use of molten salts and hydroxides (or mixtures thereof) along with substantial additions of water thereto, for the stream casting of molten metals which are essentially non-reactive to the liquid mold material(s) containing said water additions. Such water additions lower the melting points, increase fluidity, and enhance the thermal characteristics of the liquid mold materials so composed. Due to the rapid nature of the stream casting processes, molten metals having considerable reactivity to the water-containing liquid mold materials can be effectively processed therein. The resulting solidified structure(s) to be cleansed of such reactive materials immediately after stream-cast forming.

The novel features which are considered characteristic of this invention are set forth with particularity in the appended claims. The invention itself both as to its organization and method of operation, as well as additional objects and advantages thereof, will best be understood from the following description when read in connection with the accompanying drawings, in which:

FIG. 1 is a partial axial sectional view illustrating two forms of apparatus which utilize a method of this invention;

FIGS. 2A to 2H are cross-sectional views, illustrative of the various orifice configurations of the molten metal streaming nozzles used in this invention, and grouped together as FIG. 2;

FIG. 3 is a group of views as follows:

FIG. 3A is a cross-sectional view of a streamed molten metal shape with its encompassing liquid mold material and confining conduit. FIG. 3A illustrates a system wherein the primary function of the liquid mold material is to conduct heat from the molten metal, being stream cast, to the water-cooled conduit surface;

FIG. 3B is a cross-sectional view similar to that of FIG. 3A. FIG. 3B illustrates another liquid mold system wherein the primary purpose of the liquid mold is to act as a heat sink which abstracts sufficient heat from the molten metal shape to substantially solidify it;

FIG. 3C is a cross-sectional view illustrative of another structural shape which can be stream cast by the system (heat conduction) of FIG. 3A;

FIG. 4 is an axial sectional view of one embodiment of this invention wherein stream casting in a vertically downward position is carried out;

FIG. 5 is an axial sectional view of another embodiment of this invention wherein a hollow shape is stream cast in a vertically upward position;

FIG. 10 is an axial cross-sectional view of the exit end of a horizontal stream casting system;

FIG. 10A is a similar view illustrative of a system operating at an angle to the horizontal;

FIG. 10B is a similar view illustrative of a system exiting vertically upward;

FIG. 11 is a series of partial axial cross-sections illustrative of a system wherein a streamed molten metal structure is reduced in cross-section during streaming and prior to solidification of said structure;

FIG. 11A is a partial axial cross-section, of a part of FIG. 11, illustrating a further embodiment of this system;

FIG. 11B is a partial axial cross-section of a system wherein additional liquid mold material is introduced (at a down-stream point) to the original liquid mold material (and its encompassed, streamed structure) so that the temperature will be equalized at a specific desired temperature.

FIG. 15 is a partial cross-sectional side view of a continuous casting machine wherein two layers of liquid mold material (encompassing the molten metal structure(s) to be stream cast) form continuous loops which permit exit from, cooling of, and reintroduction to the stream casting system;

FIG. 15A is an end cross-sectional view of the continuous casting machine depicted in FIG. 15;

FIG. 17 is an axial cross-sectional view of a system for continuously stream casting metal spheres of exceptional roundness;

FIG. 18 is an axial cross-sectional view of a system wherein solid pellets are continuously melted, formed, and solidified to exceptionally uniform spheres for use as ball bearings.

Figure 7B:
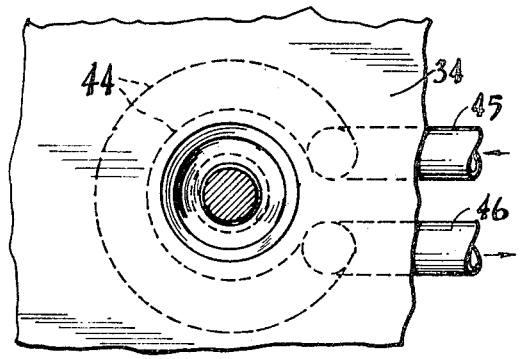
FIG. 7B is an end view of the same.

In all of the figures wherein arrows are used to designate the direction of material flow (movement) an additional convention is used in that the relative length of the arrow indicates the rate of flow. The longer the arrow, the faster the rate of flow and vice versa. Such convention is necessitated by the teachings of this invention being dependent on clearly identifying flow rates at various points along a conduit and at entrance orifices.

FIG. 1 illustrates the adaption of the dynamic (moving) liquid mold principle to the art of casting a sheet or slab of metal onto the surface of a liquid mold material. In the prior art the solidifying plate is drawn across the surface of the liquid mold and continuously removed from the static liquid mold by lifting it off of the surface or drawing it through a restrictive orifice at the exit end after it has completely solidified. Such prior art is best exemplified by the invention of C. D. Coxe (U.S. Patent 2,298,348) and an improvement thereon by H. A. Fromson (U.S. Patent 2,754,559).

FIG. 1 shows a longitudinal cross-sectional view of a means for continuously casting flat objects (as sheet or plate) wherein a containing solid trough 1 is water cooled on its bottom side by a plurality of spray nozzles 2. At the entrance end 3 of this casting trough is a refractory base plate 4 onto which the liquid mold material 5 (introduced by way of spout 6) and the molten metal to be cast 7 (introduced by way of spout 8) are poured. The base plate 4 has an integral back plate 9 which acts as the containing wall of the trough at its entrance end 3.

In my process, the liquid mold material 5 is continuously poured into the casting trough 1 and forms a dynamic (flowing) layer 10 of liquid mold material between the trough bottom 1 and the flowing molten metal layer 11 to be solidified thereon by heat extraction through the liquid mold 10 and the trough bottom 1. The liquid mold layer may be either a thin lubricating film or a substantially thick flow as desired (thinner layers being preferred due to the resulting greater rate of heat passage therethrough extracted). As the molten metal 11 flows from the entrance end 3 (along with and on top of the denser, cooling, liquid mold layer 10) to the exit end 12, the molten metal starts to solidify at some critical area 13 where a thin skin of solidified metal is formed at the interface between the molten metal and the cooling liquid mold. It is important that, at this critical area 13, the molten metal layer 11 and the contiguous surface of the liquid mold layer 10 be flowing in a synchronous manner so as to avoid tearing, accordion pleating, folding, or wrinkling of the thin layer of incipient solidified metal. Of even greater importance is the minimizing of any shearing action at the liquid mold-molten metal interface which results in mixing of the liquid mold and molten metal. Such minimized shearing action at the critical area 13 can best be determined experimentally by observing the surface smoothness of the exited solidified plate for any set of pouring conditions. That set of conditions which produces the optimum smoothness of the solid surface, which was in contact with the liquid mold material, results from a minimal interface shearing action. Such optimum smoothness also indicates that deleterious intermixing of the liquid mold and molten metal have been minimized by a substantially equal flow of both materials towards the exit end of the continuous casting mechine.

As the molten metal layer 11 flows down the casting through 1, on top of the similarly flowing liquid mold material 10, it continuously solidifies until it forms a substantially solidified plate 14 at the exit end 12 of the casting mold. Due to the lower temperature at the exit end 12, a solidified layer 15 of the previously liquid mold material will generally form adjacent to the water-cooled trough 1 and restrict passage (but not stop such flow) of the liquid mold material. This restricted passage merely causes a faster flow of the liquid mold material near the exit end. However, since the plate 14 is substantially solid at the exit end, no deterioration of surface finish or detrimental intermixing results from the increased relative movement between the liquid mold and the solidified metal at their interface.

As can be seen from FIG. 1 and the teachings expounded herein, the substitution of a dynamic (flowing) liquid mold in any of the processes (whether double layered or multilayered) of the mentioned prior art results in very worthwhile and beneficial improvements thereto and the teachings of my invention apply to any and all of the prior art wherein such static liquid molds are utilized.

It should be also noted that, if the cross-section of FIG. 1 is rotated about a longitudinal axis 16, a hollow cylindrical configuration is generated which (when utilized as a centrifugal mold) is a simplified embodiment of my prior invention as disclosed in the aforesaid patent application, Ser. No. 538,506.

In the foregoing processes, the liquid mold materials are necessarily either denser or lighter than the molten metal being cast and, in all cases, the multiple layers float one on the other. The shearing action at the layer interfaces is severely restrictive to those liquid mold-molten metal combinations which exhibit even slight solubility one in the other. By use of a dynamic liquid mold in a synchronized flow with the contiguous molten metal layer, a much greater range of solubilities between the liquid mold-molten metal materials can be tolerated and this aspect greatly extends the range of selection of liquid mold materials and of molten metals to be continuously cast by these processes.

FIGS. 2A–2H illustrate various cross-sections of streaming nozzles and the orifice configurations 17 enclosed by a refractory structural material 18 which is substantially insoluble in and nonreactive to the various liquid mold materials and molten metals use in the application of a further embodiment of this invention. The numeral 17 can also be taken, in each figure, as representing the configuration of the structure to be cast. As can readily be seen, FIGS. 2A through 2D represent configurations which, in smaller cross-sectional thicknesses, can be flexed or bent when in a substantially solid state and, as such, are amenable to vertical downward streaming along with and within the body of a flowing liquid mold of less than or equal density to the molten metal being solidified. Such solidified cross-sections can then be drawn out of the bottom or side of the tank (into which the liquid mold and contained solidified metal structure flows) by way of a slightly restrictive (squeegeeing) exit orifice or, alternatively, they can be flexed sideways and upward and withdrawn via the surface of the liquid mold material. Rigid structures (FIGS. 2E through 2H) can also be stream-cast vertically downward and removed from the system through a slightly restrictive exit die at the bottom of the container.

Configurations represented by FIGS. 2E through 2H represent rigid structures which can best be streamed vertically upward along with and within the body of a flowing liquid mold of greater than or equal density to the molten metal being solidified. Such solidified longitudinal structures exit above the surface of the liquid mold material and are further withdrawn by mechanical means for cutoff to desired lengths. It can also be seen that the configurations represented by FIGS. 2A through 2D are also amenable to vertical processing in the upward direction using liquid flowing molds of greater than or equal density to that of the molten metal being solidified.

All cross-sectional configurations illustrated in FIG. 2 are amenable to horizontal or slantwise processing to solid longitudinal structures, within the body of a synchronously flowing liquid mold, wherein the density of the cooling liquid mold material is approximately the same as the density of the molten metal at a temperature just above the solidification point.

In all subsequent figures, wire of round cross-section will be used as the structure being formed by the practice of the inventions embodied herein. It will be understood that the same practice is equally illustrative of the continuous casting of all other structures (e.g. the shapes 17 of FIGS. 2A–2G) except for the configuration of the nozzle and cross-section of the molten metal stream to be solidified. Exceptions to the foregoing are hollow longitudinal structures (such as pipe or tube) and spheres. Separate figures will be used to illustrate the method and apparatus for the manufacture of these items by the teachings of this invention.

FIG. 3 illustrates two types of synchronized, flowing liquid mold-molten metal systems (using molten metal wire of round cross-section 19A as an illustrative structure) wherein one (FIG. 3A) is that system where the liquid mold 20A is relatively thin and has the primary function of conducting heat from the molten metal 19A, being stream cast therein, to the water cooled wall 21A of the containing conduit wherein both liquid mold and molten metal axially flow in synchronous, laminar manner.

FIG. 3B illustrates the case where the liquid mold 20B is sufficiently large that it acts as a heat sink and the heat given up by the molten metal structure 19B is absorbed by the body of the liquid mold as they flow axially with synchronous, laminar flow down the length of the conduit 21B. The exterior surface of the conduit 21B may, but need not be, water cooled.

FIG. 3C illustrates the same type of heat abstraction as shown in FIG. 3A but with a more complex molten metal structural shape 19C (I-beam) surrounded by a relatively thin layer of liquid mold material 20C within a conforming water-cooled, shaped, conduit 21C of generally similar cross-section.

It can be readily visualized that the system illustrated in FIG. 3B can also be utilized in stream-solidification of the molten metal shape 19C. Such flowing liquid mold-molten metal shapes can be utilized in vertical steaming (up or down), horizontal streaming or streaming at a slant to the horizontal depending on the relative or equal densities of the liquid mold versus the molten metal phases used. Also, other shapes of molten metal (such as plate, channel, angle, etc.) can be easily visualized as being amenable to either system (FIGS. 3A or 3B) of stream casting.

With respect to the two types of heat abstraction systems utilizing liquid mold materials (these two system-types are illustrated in FIGS. 3A and 3B), the system of FIG. 3A (wherein a relatively thin encompassing layer of liquid mold material 20A acts as a heat transfer medium between the structure 19A (to be stream cast) and the exterior water-cooled conduit 21A) is best used where rapid removal of heat from the stream cast structure is desired. Such structures are generally those with a more massive cross-section. The system of FIG. 3B (wherein a relatively thick encompassing layer of liquid mold material 20B acts as a heat-sink and abstracts heat from the structure 19B, being stream cast therein, by virtue of its own heat capacity) is generally used where an optimum of laminar flow is mandatory. Such structures 19B are generally those of fine detail or thinner cross-section.

It can readily be appreciated that many such systems involve a compromise between heat transfer and heat absorption by the liquid mold material 20. A relatively small amount of experimentation gives an insight into the overall techniques of the stream casting process that permits a judicious choice of which system, or compromise system, to use for any specific structural shape, cross-section, or metal being so processed. This also pertains to the selection of the liquid mold material 20 to be used.

FIG. 4 illustrates a system wherein a molten metal structure 19 is streamed vertically downward within a body of synchronously flowing cooler liquid mold material 20 (of equal or less density than the molten metal) by way of a containing conduit 21. The molten metal structure 19 (a wire is used to illustrate the method but other longitudinal structures of any desired cross-section or shape can also be so streamed) flows into the axial center of the liquid mold stream by way of the molten metal entrance nozzle 22 (this nozzle is of a special novel type which will be disclosed later in the teachings of this invention). The molten metal nozzle is connected to a tundish 23 which is kept filled to a specific level 24 by pouring spout 25. The liquid mold material 20 flows down the conduit 21 from a tundish 26 which is kept filled to a specific level 27 by pouring spout 28. The conduit 21, and its encompassed streams of laminarly flowing liquids, is surrounded by a water jacket 29 which extends from the area 30 of the molten metal nozzle orifice downward to near the exit end 31 of the stream casting device. The cooling water in the cooling jacket flows countercurrently to the flow within the conduit 21. At the critical area 32 (the critical area has been previously defined), where a solid skin begins to form on the surface of the molten metal structure 19 to be stream cast, the molten metal and the contiguous surrounding liquid mold material are flowing at the same approximate rate of speed as indicated by the arrows 33. When the structure so streamed has been substantially solidified, it exits from the conduit 21 by way of a water cooled exit die 34 of a special novel type (to be disclosed later in the teachings of this invention) which substantially seals the gap between the exiting faces of the solidified structure and the contiguous die surfaces. The solidified structure 35 is pulled out of the exit die by means of pull-out rolls 36. The now heated liquid mold material flows to a heat exchanger (not shown) wherein its temperature is adjusted to the proper level for return to the tundish 26 and is then forced back to the pouring spout 28 by means of a pump (not shown).

As an alternative (where flexible structures are stream cast), the conduit 21 may open-end into a vat or tank filled with liquid mold material and be returned (by an overflow weir, heat exchanger, and pump) to the tundish 26. In this instance, the flexible structure (as wire, sheet, etc.) is flexed to the side and upwards so as to exit from the surface of the vat containing the liquid mold material.

An important feature in the system illustrated by FIG. 4 (and of all other systems of a like nature in the following disclosures) is the maintenance of equalized pressures between the liquid mold and the molten metal at the molten metal nozzle orifice 30. This is accomplished by maintaining a static height $Y$ (of the liquid mold surface 27 above the nozzle orifice 30) and a static height $X$ (of the molten metal surface 24 above the nozzle orifice 30) so that the ratio of $Y$ to $X$ is the same as the ratio of the density of the molten metal being streamed to that of the liquid mold material at the operating temperatures of both (cool liquid mold, hot molten metal). In the case where the densities are the same, $X$ and $Y$ would be equal. Equivalent means of maintaining equal pressures at the nozzle orifice 30 can be used.

Whereas the preferred liquid mold materials for use in downstream casting by this method are liquid metals and alloys, molten salts, and molten hydroxides; it should be realized that many molten metals can be stream cast downward along with other liquid mold materials such as water, silicones, glycerine, and various other organic liquids. This is especially true in the stream casting of the lower melting point metals (such as lead, bismuth, tin, solders, etc.) which have low specific heats and heats of fusion as well as low thermal conductivity. Higher melting point molten metals can also be so cast with such low boiling liquids as mold materials since a stable vapor phase is formed between the liquid mold-molten metal interface which drastically reduces heat transfer from one body to the other. Whereas the stream casting of high melting point metals (as steel) is possible by using the low boiling liquid mold materials mentioned (provided they do not decompose at the temperatures of the molten metals), the procedure is not recommended due to the potential danger of plugging. Any plugging of the conduit 21 rapidly produces a static condition with massive, unstable boiling of the liquid mold material and an explosion results. At the same time, the boiling point of the liquid mold material does not have to be greater than the pouring temperature of the molten metal being so stream cast by downward flowing. As an example, thinner wires, sheets and foils of such high melting metals as steel, nickel, cobalt and copper can be downstream cast, by the foregoing teachings, in a dynamic liquid mold of sodium metal.

The melting points of all of the foregoing molten metals are well above the boiling point of liquid sodium. In a similar manner, thinner structures of steel can be downstream cast in a dynamic liquid mold of lithium metal or eutectic mixtures of sodium-potassium (sometimes called Nak), sodium-lithium, or low melting mixtures of all three such alkali metals, even though the pouring temperature of steel is well above the boiling points of all three alkali metals. However, inadvertent reduction to a static condition is a potential hazard. Any hazard can be eliminated by judicious alloying of alkali and/or alkaline metals with other metals (having a higher boiling point than the pouring temperature of the molten metal being stream cast). Such higher boiling point metals include lead and silver (used for stream casting of steel, copper, nickel, cobalt, etc., and alloys thereof) and lead, indium, bismuth, cadmium, antimony, thallium, and tin for lower pouring temperature metals to be stream cast (such as aluminum, magnesium, etc.).

Figure 6:
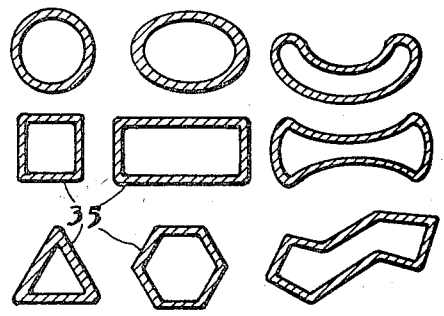
FIG. 6 illustrates various cross-sectional views of hollow shapes which can be stream cast vertically upward by the method of FIG. 5.

FIG. 5 illustrates a system wherein a molten metal structure 19 is streamed vertically upward within a body of synchronously flowing, cooler liquid mold material 20 (of equal or greater density than the molten metal being stream cast). Such a system can stream cast either flexible or rigid solid shapes (in which case, the system is practically that of FIG. 4 turned upside-down) but is particularly amenable to the streamcasting of longitudinal, rigid shapes having a hollow center (cross-sections of which are shown in FIG. 6). For illustrative purposes, a tube of circular cross-section is utilized as the structure being stream cast vertically upward.

In FIG. 5, the molten metal 19 to be stream cast, flows upwards from orifice tip 30 of a double walled ring nozzle 22 which forms a molten metal tube surrounded by a synchronously, vertically flowing outer-cylindrical wall of cool liquid mold material 20 and an inner synchronously, vertically flowing cylindrical wall of cool liquid mold material 20D. The inner cylindrical wall 20D of cool, liquid mold material is contained between the cylindrical tube of molten metal 19 and the exterior surface of a cylindrical, tubular, conduit 21D. Said conduit 21D extends upwards to a point 38 (where the exiting stream cast metal tube is completely solidified) where its end acts as a weir over which the inner wall of cooling liquid mold material 20D flows and thus exits downwardly through the interior of conduit wall 21D and out of the steam casting system. The outer cylindrical wall 20 of cool, liquid mold material is contained between the cylindrical tube of molten metal 19 and the interior surface of a cylindrical, tubular, conduit 21. Said exterior conduit 21 extends upwards to the point 38 where its end acts as an overflow weir wherein the exterior wall 20 of cooling, liquid mold material overflows into an annular catch basin 39 and exits from the system by way of pipe 40 The solidified, cylindrical tube 35, which exits from the surfaces of the liquid mold walls 20 and 20D, is pulled upwardly by a pair of opposed pull-out rolls 36 and may be cut off to desired lengths at any point above these pull-out rolls. The exterior tubular conduit 21 is encased in a water cooling jacket 29 from point 30 to point 38 and the interior tubular conduit 21D may be cooled in a like manner although it is not mandatory (and is not shown) except for the stream casting of heavy walled metal tubes. In all cases, the water in the cooling jacket 29 flows countercurrently to the streamed materials within the conduit.

With respect to FIG. 5, the teachings as outlined for FIG. 4 also apply. The flow rates of the molten metal being stream cast must be approximately equal to those of the contiguous surfaces of the inner and outer liquid mold streams at the critical area (previously defined). Also, the liquid mold material, exiting from inner conduit 21D and the outer exit pipe 40, pass through a heat exchanger and pump (not shown) and are returned to the system via pouring spouts and tundishes (with appropriate conduit connections to the system shown in FIG. 5—none of which are shown but are similar to those of FIG. 4). The liquid mold-molten metal levels (Y and X respectively) of FIG. 4 also must be at equal elevation (for the case of equivalent densities for liquid mold and molten metal) or the ratio of the heights X and Y must be equivalent to the ratio between the densities of the liquid mold material and the molten metal, being stream cast, at their respective operating temperatures. Likewise, to the teachings expounded for FIG. 4. the molten metal orifice nozzle 22 of FIG. 5 is of a special, novel construction. The liquid mold materials for use in the system of FIG. 5 are molten salts (and mixtures thereof), molten hydroxides (and mixtures thereof), or molten metals (or mixtures thereof) which have equal or greater density than the molten metal being so cast and are substantially immiscible with and nonreactive to the metal being cast in its liquid and solid state. The decreased restrictions on the upper limit for the boiling point of the liquid mold material also applies to the system illustrated in FIG. 5.

With reference to FIG. 5, it can readily be appreciated that the liquid mold material 20 (external to the streamed, hollow molten structure 19 and subsequently solidified structure 35) can be reduced in quantity to a mere lubricating film due to the tendency for the stream cast hollow structure to shrink (diametrically). In this instance, the heat is abstracted from the structure 19 and 35 by way of the water-cooled conduit wall 21. The thin film of liquid mold material 20 is highly heat conductive and fills the gap between the cold conduit wall 21 and the external surface of the stream cast structure 19 and 35 and thus affords continued, highly effective, thermal cooling contact from point 30 upwardly to point 38. The internal cylinder of liquid mold material 20D must be sufficiently thick to prevent the solidified structure 35 from shrinking onto, and binding against, the inner conduit 21D. As alternatives, the outer lubricating film of highly heat conducting liquid mold material 20 may be static and merely fill the interspace (gap) between conduit 21 and solid structure 35 by means of the holding trough 39 (in this instance, there would be no exit 40 to the annular trough 39). Also, the internal liquid mold material 20D and conduit 21D may be eliminated and replaced by a molten pool of the metal to be cast 19 so that the molten metal 19 merely freezes to allow shell 35 by contact with the cold surface of the water-jacketed conduit 21. In this instance the hollow shell which freeze-forms by contact with the inner wall of the conduit 21 is pulled upwardly as the wall of the freeze-formed hollow structure grows in thickness. Continued thermal contact is assured by the interspace (between the I.D. of conduit 21 and the O.D. of the structure 35) being filled with a highly heat conductive liquid mold material 20 which also acts as a mold lubricant. The filling of the interspace (gap), of this limited system, with a liquid metal of high heat conductivity is novel and is so claimed.

FIG. 6 illustrates a number of examples of cross-sections of hollow shapes which are amenable to stream casting by the teachings expounded for FIG. 5. The process is not limited to the examples shown, since the wall of the hollow cross-section can have practically any irregular or zig-zag closed shape desired. Such hollow longitudinal forms can be used "as is" or may be collapse deformed to solid, longitudinal structural shapes in accordance with the teachings of my prior application, Ser. No. 538,506 referred to above. Longitudinal lengths of such hollow structures may also be used for extrusion preforms (as in the extrusion of seamless tubing) or may be subjected to draw-die action to refine the structure and imprve mechanical properties.

Figure 7A:
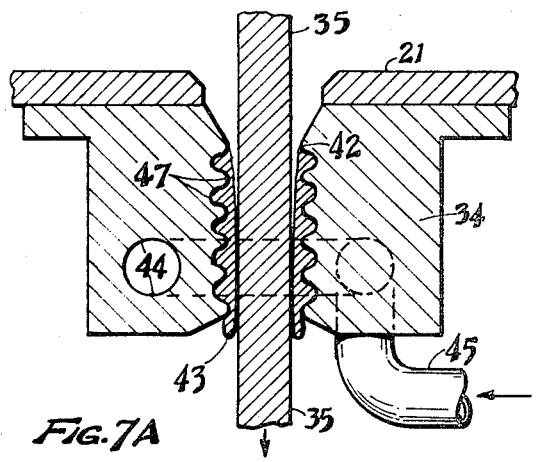
FIG. 7A is an axial cross-sectional view of a self-sealing exit orifice (for the solid stream cast structure) which utilizes a body of high heat conductivity metal.
Figure 7C:
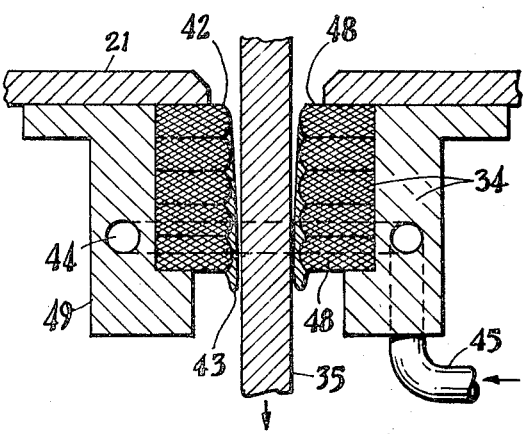
FIG. 7C is an axial cross-sectional view of a self-sealing exit orifice which utilizes a series of stacked washers, of a pyrolytically formed material, as a body of high heat conductivity material.

FIG. 7 illustrates two embodiments of a special, water-cooled exit die 34 through which the solidified structure 35 that has been stream cast, may exit from the system with a minimum of leakage of liquid mold material 20 through interstices between the solid structure 35 and the wall 42 of the conforming, but oversize, die orifice. Package of liquid mold material is kept to a minimum by using a high heat conductive material for the die block and water cooling the die block so that liquid mold material (passing through the interstices) forms a solidified layer 43 between the inner die wall 42 and the exiting solid structure 35. FIG. 7A is a cross-sectional view of such a die wherein the die-block 34 is made from a high heat conductivity metal, such as copper, which is cooled by passing water (or an equivalent coolant) through an internal passage 44 by way of an entrance tube 45 and an outlet tube 46. The inner orifice surface 42 has a series of annular, gentle, lands and grooves 47 which act as mechanical locks to prevent the solidified layer 43 of mold material from slipping out of the exit end of the die 34. FIG. 7B is a top view of the die block type shown in FIG. 7A. FIG. 7C is a cross-sectional view of a preferred embodiment of the exit die wherein stacked washers 48 (cut from a plate of pyrolytic material—see FIG. 8) are used as the high heat conductivity die block material. The stacked washers are circular on the outside and are contained within a water-cooled copper ring 49 which is shrink fitted (for better thermal contact) onto the outside of the cylindrical stack of pyrolytic washers. Each pyrolytic washer 48 is rounded off on its inner diameter so that, when fitted into the stack, a series of annular ridges 47 exit down the orifice wall. All other details are the same as in FIGS. 7A and 7B.

Figure 9:
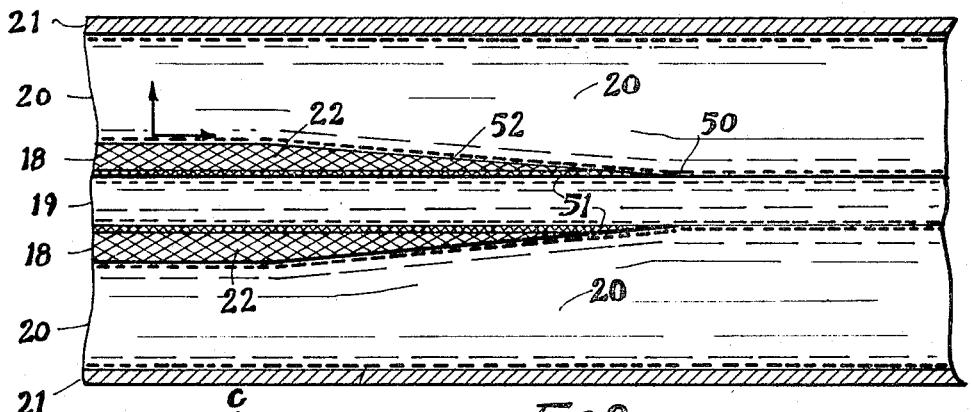
FIG. 9 is a partial axial cross-sectional view of a unique molten metal stream casting nozzle (of pyrolytic material with the A-axis oriented in the direction of streaming) encompassed by liquid mold material and the surrounding conduit wherein streaming takes place.
Figure 8:
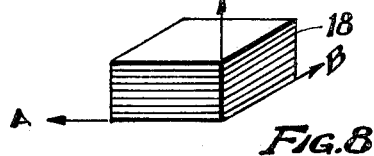
FIG. 8 is a perspective view of a rectangular section of pyrolytic graphite which is used to illustrate the advantages to be derived by use of a specific orientation of this material.

FIG. 8 illustrates the desirable physical properties of pyrolytic materials (such as pyrolytic graphite, pyrolytic boron nitride, and grafoil) which permit their advantageous use in the exit die shown in FIG. 7C and the molten metal entrance nozzle to be shown in FIG. 9. Pyrolytic graphite is formed by thermal decomposition of a hydrocarbon gas (as methane) as it contacts a hot surface. The pyrolytic graphite builds up in a layered structure from the hot surface with the plane of the lamellar structure being parallel to the surface on which it was formed. It is common technical practice to refer to the AB-plane as the A-direction since the properties in both the A and B-directions are identical. The C-direction is perpendicular to the A-plane and the lamellar structure. Pyrolytic graphite is a highly refractory material 18 which exhibits a thermal conductivity equal to that of copper along the A-plane but is practically an insulator along the C-axis. The ratio of thermal conductivities along the A-axis to that along the C-axis is over 100 to 1. In FIG. 7C, the pyrolytic washers 48 have the highly conductive A-plane perpendicular to the axis of the exit die orifice so that the liquid mold material is rapidly solidified into a layer coating the orifice surface. Other pyrolytic materials 18 (as boron nitrate) are made in a manner similar to that described and the properties are also similar. Such pyrolytic materials can be made as free-standing shapes by depositing the material onto the surface of a preformed, heated mandrel (as of ordinary graphite) and then removing the graphite preform (as by machining it away) so that the pyrolytic shape deposited thereon remains. Nozzles of pyrolytic materials having specific predetermined shapes are thus readily made of these materials.

FIG. 9 is an embodiment of a molten metal streaming nozzle 22 fabricated from a pyrolytically formed material 18 such as pyrolytic graphite, pyrolytic boron nitride or grafoil. The A and C-directions of the pyrolytic material composing the nozzle are shown by the branching arrows and, for purposes of illustration, a nozzle having a round cross-section (used for stream casting wire) is employed. In normal practice, where nozzles of metal are used, the cold liquid mold material 20 flowing down conduit 21 rapidly extracts heat across the wall 22 of the molten metal entrance nozzle so that the molten metal 19 freezes along the inside surface of the nozzle and restricts the flow of the molten metal. Even where a refractory nozzle of low thermal conductivity is used, the requirement of a feather edge 50 (so as to maintain a smooth laminar flow where the liquid mold and molten metal streams become contiguous, creates a situation wherein the heat conducted across the thin feathered wall 50 at the nozzle tip is sufficient to cause solidification problems.

By using a pyrolytic refractory material 18 to form the nozzle 22 (or nozzle tip insert), in such a manner that the C-direction (insulating) is perpendicular to the nozzle wall and the A-direction (highly heat conductive) is parallel to the flow of molten metal, the layer 51 of pyrolytic material immediately adjacent to the molten metal 19 becomes as hot as the molten metal. Due to the extremely high heat conductivity of the nozzle material in the A-direction and the molten metal 19 flow towards the feathered tip 50, the high temperature lining 51 of the nozzle 22 extends all the way to the tip 50. This obviates any tendency towards molten metal freezing at the nozzle tip. A further requirement is that the tip bevel 52 must be feathered from the cold side (cool liquid mold) towards the hot side (molten metal) so that the hot layer 51 extends all the way to the tip 50. The bevel 52 is ground-formed and, thus, cuts across the lamellar strata of the pyrolytic material. If the bevel was so ground that it sloped towards the cool liquid mold material 20, a cold layer would exist at the tip 50 which would greatly compound the problem of metal freezing at this point.

Since such nozzles can be formed over a mandrel of any pre-shape desired (the process of manufacture is analogous to electroforming), very small and detailed nozzle orifices can be so made. A roughly equivalent nozzle of this type can be made by cementing grafoil (a flexible foil of pyrolytic graphite) onto the inner surface of the molten metal conducting nozzle. In this manner, the grafoil acts as the extended hot layer 51.

A great advantage of the extended hot layer or lining to the molten metal nozzle derives from the fact that the molten metal contiguous to the hot surface remains at the same temperature as the body of the molten metal and retains the high fluidity necessary for stream casting of structural cross-sections having complicated and fine detail.

FIG. 9 is also illustrative of horizontal stream casting wherein the molten metal structure 19 exiting from the shaped orifice of the nozzle 22 is surrounded by a synchronously flowing body of cold liquid mold material. In the case of horizontal stream casting, the cold liquid mold material 20 and the molten metal 19 (at its solidification temperature) must have substantially equal densities to prevent the streamed metal structure 19 from floating upward or sinking (depending on the relative densities) in the cool liquid mold material 20. In FIG. 9, the upstream and downstream portions of the system (not shown) can be the same as the portions upstream and downstream from the nozzle 22 of FIG. 4. Alternatively, the downstream exit may be as in FIG. 10, following.

FIG. 10 shows the output end of a horizontal stream casting system wherein the liquid mold material 20 is of the same density as the molten metal 19 being processed. The entrance portions of the system (not shown) are the same as shown in FIG. 4. In FIG. 10, the conduit 21 terminates at point 55 and empties the contained liquid mold material 20 into catch-basin 53. The solidified structure 35 continues onward, horizontally, through a slot 56 in the opposite wall of the catch-basin and from there to synchronized pull-out rolls (not shown). The liquid mold material exits from the catch-basin 53 by way of pipe 37 and returns to the system by way of a pump and heat exchanger (not shown).

FIG. 10A is identical to FIG. 10 with the exception that the conduit 21 angles upward (at any angle $\varphi$) so that the solidified structure 35 exits from the open top (or an orifice therein) of the catch-basin 53.

FIG. 10B is the same as FIG. 10 except that the conduit 21 is vertical and the solidified structure 35 exits vertically between synchronized pull-out rolls (not shown). By vertical stream casting upward, the liquid mold material can be of equal or greater density than the molten metal being stream cast.

FIG. 11 depicts a system wherein the conduit 21 is gradually tapered (from the position 57 of the molten metal exit nozzle 22 to the position 58 where the conduit achieves its minimum cross-section). In this system, the liquid mold material 20 is not hot (at or above the temperature of the molten metal 19 being stream cast) and continues so until it is cooled by the encasing water-jacket 29. At the tip of the molten metal exit nozzle 22, the molten metal 19 and liquid mold material 20 flow at a fairly slow rate of speed as indicated by the equal but short arrows 54. As the liquid mold material and its encompassed molten structure flows down the constricting conduit, the cross-sections of both are reduced and, at the same time, their velocity is increased as indicated by the progressively longer arrows 54A and 54B. At point 58, where the conduit ceases to taper and becomes uniform, the molten structure has thinned down in direct proportion to the cross-sections at points 57 and 58. The liquid mold material is then cooled by an encasing water-cooling jacket 29 and, in turn, cools the molten metal structure 19 to a solid, stream cast structure 35. The exit portion (subsequent to the water-cooling jacket) of FIG. 11 is the same as FIG. 10. The system can be operated vertically upward or downward or at any angle depending on the relative densities of the liquid mold material and the molten metal being stream cast. The stretching-out of the molten metal structure in its molten state enhances the longiudinal properties of the solidified structure.

FIG. 11A depicts a variation of the system of FIG. 11 in that the water jacket 29 extends upstream of point 58 and well up onto the tapered section of the conduit 21. In this manner, incipient solidification of the molten metal being stream cast begins while the molten metal stream is still being stretched out by the continued constriction of the conduit. The longitudinal properties of the solidified structure are enhanced to an even greater extent by this innovation.

FIG. 11B depicts a variation of the system of FIG. 11A in that an annular external conduit 21P slants into (and in the direction of flow of) the stream casting systems, disclosed herein, and introduces a large amount of additional, cold liquid mold material 20E so that the intermixed liquid mold materials 20E' are sufficiently cold to solidify the molten metal structure 19 to the exiting structure 35. In this instance, the added, cold liquid mold material 20E serves the same purpose (and acts in lieu of) the water-cooling jacket 29 of the systems which have use thereof.

FIG. 11B also depicts a system wherein the introduced liquid mold material 20E can be in such an amount and at such a temperature that the admixed liquid mold materials 20E' (composed of liquid mold materials 20 and 20E) and the encompassed structure 35 equalize at a very specific and pre-determined temperature which enhances subsequent processing whether of a mechanical or metallurgical nature. In this instance, the liquid mold material 20E may be hotter or colder than the original liquid mold material 20 so that the admixture 20E' will be at the desired temperature level. As an illustrative example, steel is amenable to a great many different thermal and thermal-mechanical treatments such as isothermally transforming to pearlite, austempering, martempering, quench hardening and tempering, patenting, ausforming. etc. All such heat treatments or thermal-mechanical treatments are readily realizable by the method and system of FIG. 11B. All other metals, so stream cast to solid structures, can advantageously utilize the method and system of FIG. 11B although not in the great variety pertaining to steel.

Figure 12:
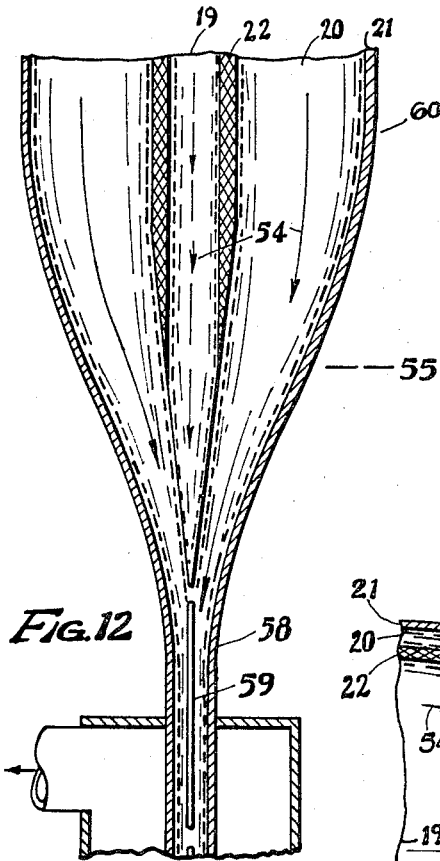
FIG. 12 is a partial axial cross-section of a system which produces thin continuous or discontinuous structures by rapid drawing out of the streamed molten metal structure by a much faster flowing, encompassing body of liquid mold material.

FIG. 12 depicts a system whereby fine thin structures such as wire, foil, etc., in either continuous or discontinuous form can be stream cast. This system differs from that shown in FIG. 11 in that the hot (temperature above the melting point of the molten metal 19 being stream cast) liquid mold material 20 at the point 55 is flowing at a far greater rate of speed than the molten metal 19 within the nozzle 22. The net result is that the molten metal 19 is aspirated from the nozzle orifice even though the liquid mold material 20 is at a much higher pressure than the molten metal stream exiting from the nozzle tip. This system differs from the prior systems disclosed herein by virtue of unequal pressures and non-synchronous flow rates between the liquid mold material and the molten metal being stream cast. Also, at extremely high ratios of liquid mold 20 to molten metal 19 flows, harmonics are set up in the system which causes separation of the streamed molten metal. It should be noted that continuous structures (as wires, foils, etc.) can be stream cast by this technique where the mentioned ratio is not too high.

Whereas the system depicted in FIG. 12 is oriented so that the flow of the conduit 21 contents is vertically downward, it can actually operate in any position (as vertically up or down, horizontally, or at a slant to the horizontal). Furthermore, while it is preferred that the density of the liquid mold material 20 be less than or equal to the density of the molten metal 19 when operated in a vertically downward direction, the liquid mold material can actually be denser than the molten metal being stream cast with little deleterious results. Likewise, whereas it is preferred that the density of the liquid mold material 20 be greater than or equal to the density of the molten metal 19 when the system is operated so that flow is vertically upward, it will operate almost as well where the densities are in the reverse order. For horizontal operation or at a slant to the horizontal, a liquid mold material 20 density that is nearly equal to that of the molten metal 19 is preferred. However, unequal densities, either way, does not unduly influence the resulting output of continuous or discontinuous thin structure. In this system, the liquid mold material 20 is hot (at or above the temperature of the molten metal 19) and is flowing at a far greater rate of speed than the molten metal 19 in the conducting passage of the nozzle 22. An indication of the relative rates of flow is shown by the relative lengths of the flow arrows 54. The aspirating effect is beneficially accentuated by belling-down of the conduit 21 (wherein the materials flow) in the area of the exit orifice of the nozzle 22. As the molten metal 19 is pinched into a very narrow stream (considerably downstream from the nozzle 22 exit) the shearing action of the liquid mold material on the molten metal stream's surface (as well as disturbances set up in the flowing streams) causes the molten metal structure to pull apart into fairly discrete lengths 59. The length and thickness of these discontinuous structures are functions of the thickness of the molten metal stream at the nozzle 22 exit, the ratio of flow rates as delineated by flow rate arrows 54 and the contours of the system. Once the continuity of the molten metal structure has been disrupted, the conduit 21 becomes of uniform thickness and extends through a heat exchanger 29 which abstracts heat from the liquid mold material which, in turn, solidifies the discontinuous metallic structures contained therein. Once solidified, these discontinuous structures and the encompassing liquid mold material exits into a catch-basin (not shown) where the structure particles 59 either float to the surface of the liquid mold material or sink into a suitable screen retaining basket (not shown) for subsequent removal, cleaning and use. The liquid mold material then returns to the system by way of a heater (not shown) and pumping station (not shown) Discontinuous fine wires formed by this system are round and have rounded ends. They are also characterized by having a smooth surface. They may be crimped by the impact action of the encompassing stream of liquid mold material jetting into the catch basin or may retain a substantially straight form by a more gentle deceleration of the existing stream. Crimped wires are generally preferred since they are more readily matted into wire filter pads.

FIG. 12 (with or without the water-cooling jacket 29) also depicts a system for making discontinuous (or continuous) fine structures (as foil, wire, etc.) which are usually characterized by a roughened surface (due to wrinkling or accordion pleating of the incipient solid skin formed on the surface of the molten metal structure) and sharp tips or edges on the ends of the discontinuous lengths. The difference between this and the preceding system depends on the use of a cold liquid mold material 20. The cold liquid mold material rapidly chills the molten metal surface and forms a solid skin thereon. The greater flow rate and higher pressure of the liquid mold material collapses this skin upon the decreasing molten metal core of the structure as it is stretched out by the mechanics of the system. With wires, a circumferential and axial pleating of the wire surface results in the serrations already mentioned. The cross-sectional shape of such rapidly chilled fine wires can be round, diamond, triangular, square, etc. Such wires have good scouring properties and can be used in the manufacture of scouring pads. At the same time, where continuous structures are formed by using a more moderate flow rate of the cold liquid mold material, the structure surface is fairly smooth.

It should be especially noted that, in this (cold liquid mold as depicted in FIG. 12) system, the boiling point of the liquid mold material need not be above the melting point of the molten metal being stream cast. This system varies from the prior art in that it is no longer restricted by the limitation that the boiling point of the liquid mold material must be higher than the melting point of the molten metal being stream cast. As illustrative examples, molten steel, cast iron, cobalt alloys and nickel alloys may be stream cast by this system in a liquid mold of lithium. Also, molten copper or silver and their alloys may be stream cast in a liquid mold of sodium. In all of the illustrations, the melting points of the metals so cast are above the boiling points of the liquid mold materials used. In actual practice, such cold liquid mold materials as water (with or without various beneficial solutes such as deoxidants, salts, acids and bases), glycerine, silicones, etc. can be used. Even organics that heat decompose (during steam casting by this system) can be used provided that the decomposition products are not deleterious to the end results. Other non-metallic liquid mold materials, such as molten salts (and mixtures thereof) and molten hydroxides (and mixtures thereof), having relatively low boiling points, as compared to the melting points of the molten metals being so cast by this system, can be utilized advantageously.

Due to the requirement of non-synchronous flows to create a strong shearing action at the interface between the hot liquid mold material 20 and the molten metal 19 (such shearing force is necessary to pull-out and thin-down the molten metal stream 19) of this system, the liquid mold materials used must be practically immiscible with the molten metal being so stream-cast. It must be reiterated that systems involving a synchronized laminar flow of both liquid mold material and streamed molten metal are not subject to this restriction since such systems permit considerable latitude as to solubility ranges between the liquid mold materials and the streamed molten metals processed therein.

The restriction on miscibility, of the liquid mold material and the molten metal being stream-cast, applies to a limited extent to the system depicted by FIG. 12 wherein a cold liquid mold material is used. In this case, however, the restriction is not nearly so stringent as it is where the liquid mold material is hot, since the cold liquid mold material causes a solid surface skin to form on the structure (so stream cast) with great rapidity. As an illustrative example, molten beryllium can be stream cast to a thin structure (such as wire) within a fast-flowing, relative-cold body of liquid aluminum. Any slight surface contamination of the structure by the aluminum can be removed by suitable etchants. The remaining structure (as beryllium wire) is sound and commercially usable. It is possible that thin beryllium structure can be so stream-cast in a faster moving liquid mold of sodium, even though the boiling point of sodium is much lower than the melting point of beryllium. It is assumed (and probably true) that sodium and beryllium are immiscible in their liquid and solid states although, to the inventor's knowledge, no phase diagram exists to provide this contention.

Beryllium structures can be stream cast in a liquid mold material of de-watered, molten sodium hydroxide using any of the stream casting systems disclosed herein. Also, molten salts (such as the chlorides of sodium, potassium, and lithium (or low melting mixtures thereof) can be used as liquid mold materials for the stream casting of beryllium.

Figure 13:
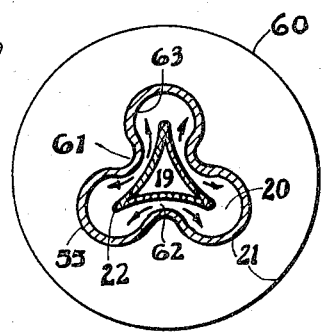
FIG. 13 is a cross-sectional view of a special molten metal exit nozzle orifice and the containing conduit which produces a stream cast structure having longitudinal flutes with cusp edges.
Figure 13A:
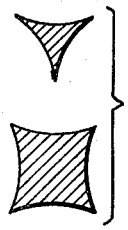
FIG. 13A shows two cross-sections of such fluted and cusped structures.
Figure 13B:
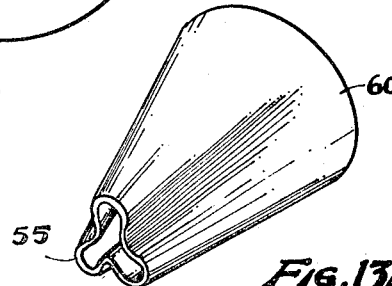
FIG. 13B is a perspective view of the specially shaped conduit of FIG. 13.

FIG. 13 depicts a very special molten metal streaming nozzle 22 exit orifice configuration which (when used in conjunction with a specially shaped conduit 21 configuration and the cold liquid mold 20 system as previously outlined for FIG. 12) produces continuous or discontinuous fine wires exhibiting longitudinal flutes and cusps. The cross-sections of such wires can be semi-triangular or square as shown in FIG. 13A. Such configurations are generally limited to a maximum of four sides since surface tension tends to round out polygonal configurations whose sides meet in angles greater than right angles (90°). In FIG. 13, the circular section 60 is that of the conduit of FIG. 12 prior to belling down, while the pleated (or propeler-like) shape is a cross-section of point 55 of FIG. 12. In FIG. 13, the exit orifice of the molten metal nozzle 22 is a triangular shape exhibiting concave sides and cusplike corners and the molten metal structure streamed therefrom also exhibits this cross-sectional shape (the cross-section may also be of a square type with concave sides as shown in FIG. 13A). The conduit 21 has a circular cross-section at point 60 which is progressively collapsed inward at three points 120° apart to form the flutes 61 at the area 55. The flutes 61 are separated from corresponding flutes 62, of the nozzle and molten metal cross-section, by a narrow band of cold liquid mold material 20. At the same time, the lands 63 of the propeller shape encompass a much larger volume of the cold liquid mold material 20. The propeller cross-section of the conduit 21 continues to accentuate to a downstream point 58 (as indicated in FIG. 12) and then continues further downstream without further change in cross-sectional shape or size. At the point 55, the flutes 62 of the molten metal streaming from the nozzle 22 tip and the constricting flutes 61 of the conduit 21, squeeze the cold liquid mold material toward the lobes 63 of the propeller cross-section. By this action, the fluted shape 62 of the molten metal stream 19 is maintained. At the same time the thin cusp points of the molten metal stream are rapidly solidified, by the surrounding cold liquid mold material, so that they retain their relatively sharp edges. Such fluted wires with sharp cusp edges may be either continuous or discontinuous depending on the flow rate of the liquid mold material (extremely fast flows causing disruption into discontinuous wire hairs). Such wires have exceptional scouring action due to their geometry.

Figure 14:
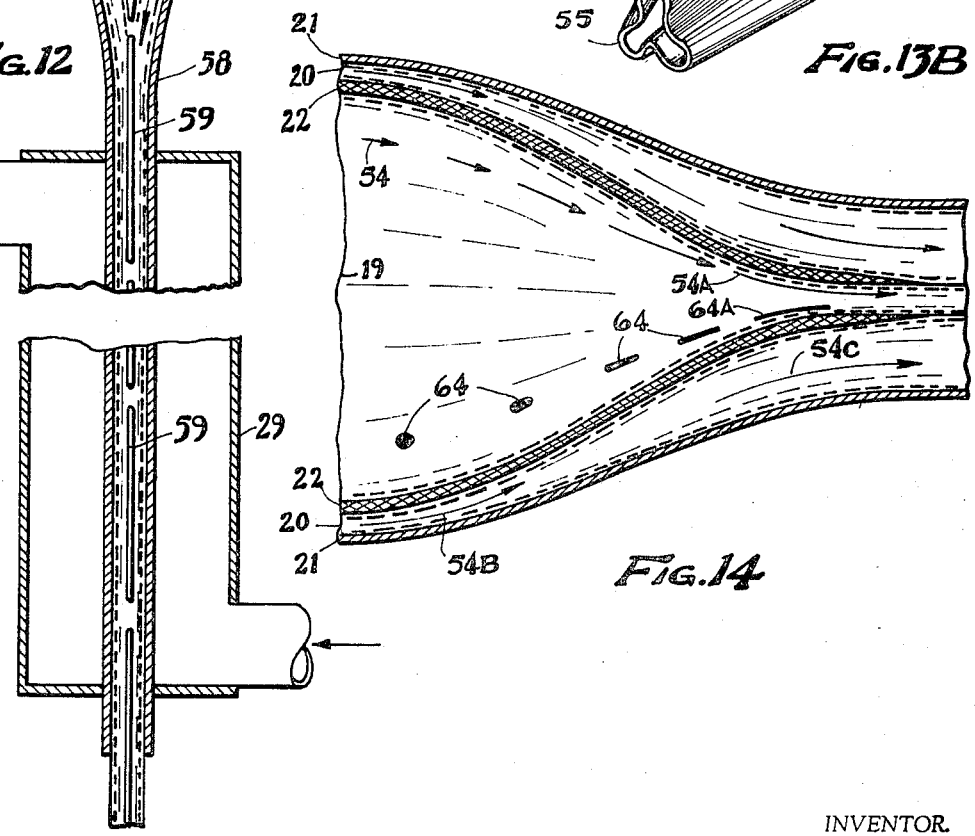
FIG. 14 is an axial cross-sectional view of a stream casting system wherein the molten metal to be stream cast is rapidly accelerated by belling down the molten metal streaming nozzle prior to its exit point. This technique elongates and renders less harmful any nonmetallic inclusions contained in the stream cast structure.

FIG. 14 illustrates a flow system wherein the molten metal 19 to be stream-cast is belled down from point 60 to point 55 (where it exits from the nozzle 22 tip). The conduit 21 containing the liquid mold material 20 is also belled down but in such a manner that the flow rate of the liquid mold material at point 60 (as indicated by flow rate arrow 54B) is the same as at point 55 (as indicated by flow rate arrow 54C which is about the same length as 54B).

On the other hand, the flow rate of the molten metal 19 greatly increases from point 60 to point 55 as indicated by the continuously increasing length of the flow rate arrows from 54 to 54A. The purpose in accelerating the flow rate of the molten metal 19 is to cause any liquid (molten) non-metallic inclusions (as sulfides), contained in the molten metal, to be drawn out to an elongated thread form. Such long, thin inclusions are far less detrimental to the longitudinal strength of structures so stream-cast than the larger, rounded inclusions 64 when solidified within the body of the stream-cast structure (as wire, etc.). Such an inclusion 64, is dipicted as a rounded particle near point 60 and is shown as becoming progressively thinner and longer, as it is accelerated toward point 55, until it becomes a very thin thread form 64A.

Such a system may be used in conjunction with any of the other systems, illustrated herein, to achieve greater integrity for the structures so stream cast.

FIG. 15 is a sectional side view of a continuous casting machine wherein two loops of liquid mold material 20 and 20X encase a synchronously flowing plate or sheet of molten metal 19 as it exits from the rectangular orifice 30 of the refractory streaming nozzle 22 at the starting end 3 of the machine. Liquid mold materials 20 and 20X can be of the same material in which case they are designed to be of the same density as the streamed molten metal at its solidification temperature.

In the preferred embodiment, however, the liquid mold material 20 is denser than the molten metal 19 so that the molten metal floats on the surface of the liquid mold material 20. In all cases, the cool liquid mold material(s) are substantially immiscible with and nonreactive to the molten metal being so stream cast.

An illustrative example of equal density liquid mold materials, used in the stream casting of aluminum, would be a sodium-lead alloy designed to have the same density as molten aluminum at its solidification point. Also, in the stream casting of molten aluminum, where denser 20 and less dense 20X liquid mold materials are used, the preferred denser liquid mold material 20 is a sodium-lead alloy containing five weight percent of sodium and having a density of about 9.9 g./cc.; the preferred less dense liquid mold material 20X would be de-watered, molten sodium hydroxide.

The molten metal 19 is supplied from tundish 23, having a molten metal level 24, and the flow rate is controlled by a stopper 65 at the start of conduit 21E which conducts the molten metal to the streaming nozzle 22. As the molten metal 19 streams out of the nozzle 22, it is encapsulated, top and bottom, by cool liquid mold materials 20X and 20 respectively which are flowing in the same direction and at a synchronized rate of speed. The liquid mold materials and the encompassed molten metal stream flow within a rectangular conduit having a bottom 21F and a top 21G both of which are water cooled from the opposite sides by spray pipes 66 centrally located in compartments 67 of dual longitudinal structures 68 around which the liquid mold materials are looped. As the flow continues down the rectangular conduit (having top 21G and bottom 21F), heat is abstracted from the molten metal 19 by and through the liquid mold materials 20 and 20X to the water cooled surfaces 21F and 21G of the conduit. Said heat abstraction freezes the streamed structure of molten metal 19 to a soid structure 35. At the exit end 12 of the stream-casting machine is located a special exit orifice 34 through which the solidified structure 35 is drawn by pull-out rolls 36 which are enclosed in a chamber 69. The chamber 69 is filled with a dry, inert gas 70. As the pull-out rolls 36 squeeze the structure 35 (as it passes between the opposed rolls) any liquid mold material remaining on the surface of the structure 35 is exuded backwards and falls into sump 71 of chamber 69. Any liquid mold material flowing over or adhering to the sides of the structure 35 is blown into the sump 71 by jets 72 of gas 70 issuing from gas nozzles 73. The structure 35 exits from chamber 69 by way of a conforming orifice 74 which is sufficiently oversized to allow the dry, inert gas 70 to escape from the chamber. The liquid mold materials which collect in sump 71 are drained off by way of valve 75 and decanted for periodic return to the system.

Just prior ot the exit orifice 34, the liquid mold materials 20 and 20X diverge, downward and upward respectively, and then loop back towards the entrance end 3 of the casting machine by way of chambers 76 and 76X respectiveiy. Two impellers 77 and 77X are located in chambers 76 and 76X where the heated liquid mold materials 20 and 20X loop backwards towards the entrance end of the stream-casting machine. These impellers 77 and 77X are turned by shafts 78 and 78X which are powered by variable speed motors (not shown). The impellers maintain the synchronized flow of the liquid mold materials 20 and 20X as they continuously loop-flow within the confines of the system. Since chambers 76 and 76X are identical, the following description thereof will be made with reference to chamber 76 only, it being understood that the description applies equally to chamber 76X.

Chamber 76 is longitudinally compartmentalized into a multiplicity of rectangular conduits as shown in FIG. 15A. These multiple conduits alternate between liquid mold material conduits 79 and cooling or heating gas conduits 80. The liquid mold conduits 79 are open at both ends while the gas conduits 80 terminate as closed tapered edges 81 at both ends so as to create as little turbulence as possible to the liquid mold material as it flows into and out of the terminal areas 81 of the chamber 76. The rectangular conduits 79 of the chamber 76 may be filled with longitudinal sections of thin walled honeycomb which act as a multiplicity of stacked hexagonal pipes for passage of the liquid mold material 20. By this means, the turbulence created by the impellers 77 is ironed out so that the liquid mold material downstream from the chamber 76 is flowing in a laminar fashion.

During production stream casting of sheet or plate strips 35, the liquid mold material 20 is heated up by abstracting and conducting heat from the solidifying molten metal stream 19. As the loop of hot liquid mold material 20 passes through the chamber 76 it is partially cooled by contact with the water-cooled surface 21 of the structure (interior to the loop) 68. However, the predominant method of cooling is by flowing cold air from the burner-box 82 down the conduit 80 to the exit port 83. The sidewalls of the conduits 80 are, therefore, air cooled and, thus, abstract heat from the adjacent liquid mold material 20 which it also contacts. The nozzles 84 have a dual purpose since, during production operation, they introduce cold air or other cold gas into the conduits 80. During idling periods (when no molten metal is being introduced into the machine) the liquid mold material must be heated by some other means so as to maintain its fluid character. In this instance, an air-combustible gas mixture is burned at the tips of nozzles 84. The flames 85 exit into the refractory lined burner-box 82 and, from there, pass down the flues (conduits 80) to the manifolded exit ports 83. In this manner, heat is introduced into the system to maintain the fluid nature of the liquid mold material 20.

As the liquid mold material exits from the downstream end of the chamber 76, it is looped toward, and then parallel to, the streamed molten metal 19 exiting from molten metal nozzle 22. In this manner, the cycle is completed and ready for a continuation of the steady-flow sequence.

The continuously, stream cast structure is actually pressure cast (with the attendant desirable features thereof) since it is subjected to a static head of liquid mold material. This pressurizing, static head of liquid mold material is maintained by the liquid mold level 27 in the standpipe 86 and can be adjusted to any desired and feasible level. Not shown in either FIGS. 15 or 15A is an exterior conduit (standpipe) which joins the liquid mold materials 20 and 20X so that the proper fill level of liquid mold material 20 can be determined by such means as gamma-ray-absorption-differential due to the differing densities of the liquid mold materials.

FIG. 15A is a cross-sectional end view of the loop, stream-casting machine depicted in FIG. 15. Its primary purpose is to show the manifolding of the burners 84 by the burner-box 82 (exit ports 83 are similarly manifolded although not shown), the compartmentalization of the chamber 76, and the rectangular conduit down which the layer of molten metal 19 and the encompassing layers of liquid mold materials 20 and 20X flow. The sides of this rectangular conduit are lined, lengthwise, with slabs of a slippery, refractory material 87 (such as pyrolytic boron nitride or graphite—depending on the molten metal being stream cast) which act as an insulating barrier to the sidewalls and, also, prevents binding or seizing by the edges of the solidified structure 35.

It should be noted that, by minor and conventional rearrangement of the tundish 23, the standpipe 86, and the sump 71 (all of FIG. 15), the continuous-loop, stream-casting machine depicted in FIGS. 15 and 15A can be operated vertically upwards or downwards or at a slant to the horizontal as desired. In these instances, the liquid mold materials 20 and 20X would be of identical materials (equal density). The density of the liquid mold material with respect to the density of the molten metal being cast would conform to the prior teachings of this invention with respect to the direction of stream casting (up, down, slant-wise).

It should also be realized that the continuous molten metal structure 19 (having a rectangular cross-section) can be replaced by a multiplicity of smaller structures (such as wire, rod, bar, etc.) which are streamed side by side so that each structure is completely surrounded by liquid mold material. In this instance, the molten metal exit nozzle 22 would be replaced by a multiplicity of such nozzles (all in the same plane) which would exit into the body of the synchronously flowing liquid mold material at the nozzle's tips 30.

Figure 16A:
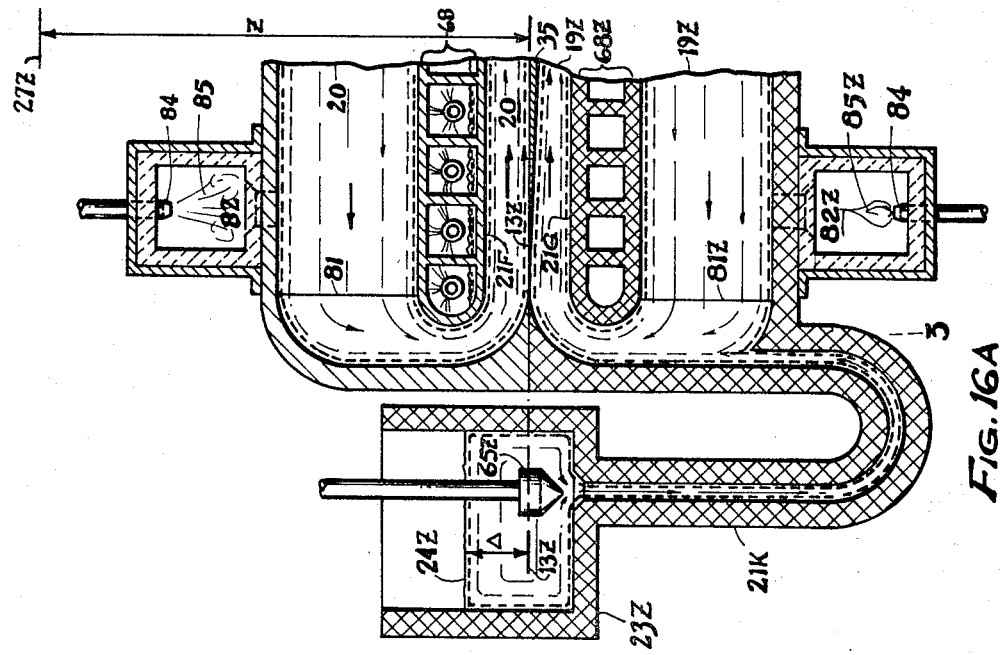
FIG. 16A is a fragmentary cross-sectional view showing another modification of the continuous stream casting machine shown in FIGS. 15 and 15A.
Figure 16:
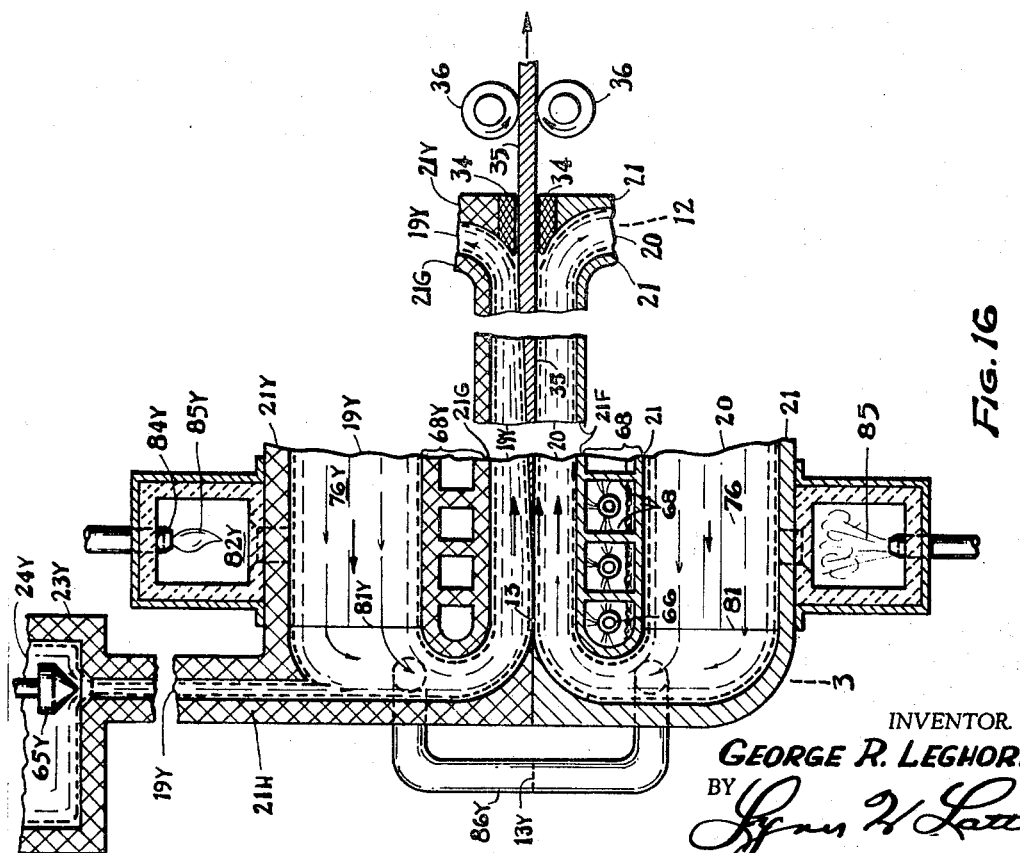
FIG. 16 is a fragmentary, cross-sectional side view of one modification of the continuous stream casting machine shown in FIGS. 15 and 15A.

FIG. 16 shows a sequence of partial, sectional side views of a modification of the continuous casting machine, depicted by FIGS. 15 and 15A, in which the upper loop (20X of FIGS. 15 and 15A) of continuously flowing material is not composed of a liquid mold material (as in FIGS. 15 and 15A) but is composed of the molten metal 19Y to be stream cast (in part) to a solid planar structure 35. The molten metal 19Y, comprising the upper loop of the stream casting apparatus, consists of a low density (as aluminum) molten metal 19Y which becomes contiguous with, and floats on the surface of, a synchronously flowing layer of denser (as lead plus 5% sodium) liquid mold material 20. As the laminarly and synchronously flowing layers of molten metal 19Y and cool liquid mold material 20 pass down the confines of the rectangular conduit having top 21G and bottom 21F, that part of the molten metal 19Y in contact with the cold liquid mold material 20 progressively solidifies until a substantially thick layer or sheet of solid metal exists at the interface between the molten metal 19Y and the liquid mold material 20 at the exit end 12 of the apparatus. This solid planar sheet 35 exits from the apparatus by way of the exit die 34 orifice as a result of the pulling action of powered, opposed, pull-out rolls 36. The remaining (unsolidified) molten metal 19Y continues around its loop by way of a heating chamber 76Y (which, when necessary, adds heat to the molten metal to maintain its fluid state) and, thence, back to the starting end 3 of the apparatus. This loop is further augmented by a conduit 21H whereby additional molten metal 19Y (to make up for the solidified portion of the metal which exits from the apparatus as the planar structure 35) is introduced into the apparatus from supply tundish 23Y.

The loop of denser, cool liquid mold material 20 is the same as that depicted in FIGS. 15 and 15A and is similarly cooled. Both loops of fluid material 19Y and 20 are impeller driven and laminarly flowed as depicted in FIGS. 15 and 15A. It should be noted that no molten metal entrance orifice (at the level of and in the horizontal plane of the planar structure 35) exists at the entrance end 3 of the apparatus and none is required for this system. An insulated standpipe 86Y (interconnecting the molten metal 19Y and the liquid mold material 20) exists near the entrance end 3 of the apparatus. This standpipe 86Y, in conjunction with a gamma-ray source and a gamma-ray-sensing-device, determines the level of the interface between the liquid mold material 20 and the molten metal 19Y at their contiguous surface.

It should be noted that the structure encasing the loop of molten metal 19Y is of a refractory material (as molded graphite or mullite) which is compatible with the molten metal 19Y flowing in the loop. Or, at least, the conduit walls of the loop are lined with such refractory materials. The conduit wals containing the liquid mold loop, on the other hand, may be of a structural metal (with or without a refractory lining as required) compatible with the liquid mold material 20 at the operating temperatures involved.

FIG. 16A is a partial, sectional side view of another modification of the apparatus depicted in FIG. 16 wherein the lower loop of liquid material is composed of a denser molten metal 19Z to be stream cast by partial solidification at the interface of the lower molten metal 19Z layer and the upper layer of less-dense, cooling liquid mold material 20. Illustrative of the fluid materials comprising the two loops would be a lower loop of molten aluminum (as the molten metal 19Z to be partially stream cast) and an upper loop of a liquid mold material 20 of cool liquid sodium (said liquid mold material being less dense than the molten aluminum). The requirements for heating the loop of molten metal 19Z and for cooling the liquid mold material 20 of this system are the same as for the system depicted in FIG. 16 and the other details of FIG. 16 also pertain to the system of FIG. 16A.

It should be noted that, whereas the system of FIG. 16A can be effectively operated, it is more difficult to operate than the system of FIG. 16 inasmuch as it requires close control of the liquid level 24Z of the molten metal 19Z to be partially stream cast therein. More than this, the solidified portion of the molten metal 19Z (which exits from the apparatus as the solid, planar structure 35) is denser than the molten metal 19Z from which it derives and, therefore, it has a tendency to sink in the less-dense molten metal 19Z. While this tendency does exist, it does not prevent the apparatus from producing an exiting solid, planar structure 35 on a continuous basis.

In the system of FIG. 16A, the level 24Z (in the molten metal 19Z supply tundish 23Z) of the molten metal must be greater (by some height Δ) than the interface level 13Z (interface between the molten metal and liquid mold material within the apparatus) due to the head of cool liquid mold material 20 layered on the surface of the molten metal 19Z. The height Δ must be equal to the product of the density of the liquid mold material 20 and the static head Z (of the liquid level 27Z, above the interface level 13Z) divided by the density of the hot molten metal 19Z. Once the value of Δ has been properly determined (as by calculation but, generally, by experiment) the proper level 24Z can be maintained by any conventional means.

FIG. 17 depicts a system wherein a round stream of molten metal 19 (such as type 52100 bearing steel) is exited from the tip 30 of a molten metal streaming nozzle 22 into the center of a synchronously flowing stream of liquid mold material 20 which is as hot as or hotter than the temperature of the molten metal 19 being streamed. This system is similar to that of FIG. 4 and would ordinarily produce a continuous stable strand of molten metal 19 confined within a hot liquid mold material 20 as it flowed within the circular conduit (tube) 21. It is the intent, however, to break the exiting molten metal stream 19 into discrete uniformly sized droplets 88 as the stream exits from the tip 30 of the nozzle 22. This breakup of the stream 19 is accomplished by the application of a vibration of predetermined frequency in accordance with the teachings of U.S. Patent 2,510,574 issued to C. W. Greenhalgh. In FIG. 17, the technique is illustrated by a longitudinally oscillating plunger 89 situated in the body of molten metal contained in the supply tundish 23. The plunger 89 is positioned immediately above the entrance opening of the molten metal streaming nozzle 22. Any other equivalent method for reducing the stream to droplets may also be used in accordance with the teachings of the referenced patent.

As the discrete, uniformly-sized, molten metal droplets 88 move along synchronously with the encompassing hot liquid mold material 20 in the conduit 21, the droplets assume a nearly perfect spherical shape due to the action of surface tension. Downstream from this area 90 (where nearly perfect molten spheres have formed), the conduit 21 passes through a water-cooling jacket 29 which abstracts heat from the conduit 21 and its fluid contents with resulting freezing of the molten droplets 88 into solid spheres or bearings 91. The still liquid mold material 20, with its contained solid spheres 91, flows out of the open orifice 92 of the conduit 21 where the bearings 91 may then be separated from the liquid mold material 20 by passage through a basket screen or, alternatively, the bearings may be heat treated directly by a special technique to be disclosed later on.

The liquid mold material 20, of this system, is supplied as shown, from tundish 26. The liquid mold material used in the system is metallurgically designed so that the density of droplets 88 at position 93 (that position along the conduit where the molten metal droplets 88 first begin to solidify) is the same as the density of the encompassing liquid mold material 20. The design of such controlled density liquid mold materials will be disclosed later.

FIG. 18 depicts a system which is similar to the system depicted in FIG. 17 inasmuch as molten metal spheres 88 pass down a conduit 21 through an area 90 (where the molten metal droplets 88 become nearly perfect spheres by the action of surface tension) and, thence, through a cooling zone, created by a surrounding water-jacket 29, which solidifies the molten spheres to solid ball bearings 91A. In this system, an equal density liquid mold material is used such that the density of the liquid mold material 20 is the same as the density of the molten spheres 88 at the start of their solidification at position 93. Likewise, the exiting liquid mold material 20 and the solid ball bearings 91A may be screen-separated after passage out of the conduit exit 92 or may, alternatively, be heat treated by a special technique to be disclosed.

In the system of FIG. 17 the ball bearings 91 are as perfectly spherical as those formed by the system depicted in FIG. 18; however, whereas the diameters of the ball bearings created by the system of FIG. 17 are quite uniform (one ball to another), they are not sufficiently uniform in size for use as precision bearings.

The system of FIG. 18, therefore, differs from that of FIG. 17 in that the metal to be cast to precision bearing is introduced into the system as very uniform and accurately weighed (with an accuracy of 0.001 of the desired weight of the ball bearings 91A) solid particles (such as upset pellets, punchings, wire clippings, etc.). Whereas the rough particles (wire clippings, punchings, etc.) are quite uniform, they are so fabricated as to be slightly overweight. They are then weighed and reduced to the desired weight accuracy by controlled etching in a suitable etching solution. Those pellets 94, of the desired uniformly accurate weight, are then introduced centrally into the hot (at a temperature well above the melting point of the bearing steel pellets used) liquid mold material so that the pellets 94 and the hot liquid mold material 20 move synchronously within the conduit 21 to subsequently form precision ball bearings 91A.

It should be noted that, whereas ball bearing steels (as type 52100) are mentioned for illustrative purposes in the systems of FIGS. 17 and 18, bearing materials composed of nickel and nickel alloys, cobalt and cobalt alloys, and combination alloys of iron, nickel and cobalt (along with other alloying constituents) are to be precision cast to ball bearings or other useful spheres by these techniques.

It should also be noted that the metallic raw materials to be converted to such precision spheres should be exceptionally clean (free of non-metallic inclusions) and should be made from vacuum degassed materials prior to conversion to such spheres 91 or 91A.

In the system depicted by FIG. 18, the heat of the high temperature liquid mold material 20 may be used to melt the solid pellets 94 or, alternatively, a means of adding heat to the system (prior to position 90) may be used. Such heating means are conventional and comprise burners, electrical resistors, induction coils, etc.

A great advantage of the system depicted by FIG. 18 is that solid spheres having a wide range of diameters (depending on the mass of the solid particles 94) can be formed. The sizes of such spheres can be controlled to range from microscopic to very large balls of exceptional sphericity.

Any mechanical, or other means, may be used to feed the solid particles 94 to the system of FIG. 18 in a regular manner, with appropriate spacing between the particles.

It should be realized that, with minor and conventional rearrangement of the feed systems of both FIGS. 17 and 18, the processes therein depicted can be readily operated horizontally, at a slant to the horizontal, or vertically upward as well as the illustrated (vertically downward) means. This is due to the essentially equal density of the liquid mold material 20 and the metal 19 or 94 being introduced therein. Also, a multiplicity of entrance points for the metal 19 or 94 can be used with larger conduits 21.

Conventionally, the solid spheres 91 and 91A (produced by the systems of FIGS. 17 and 18 respectively) would be screen separated from the liquid mold material 20 and then heat treated by conventional heat treat processing. However, if the liquid mold material, with its contained solid spheres (at an elevated temperature which permits their being heat treated without reheating), is streamed directly into a quenching bath (as of oil, liquid silicones, low melting point metals, etc.) the spheres will quench harden in a surrounding matrix of solidified liquid mold material 20. Alternatively, the liquid mold material with its contained, hot solid spheres, can be streamed into marquench or austempering baths for heat treatment by these means. Usually, the subsequent tempering temperature is sufficiently high to cause the solidified mold material 20 to re-liquify. In this instance, the solid spheres may be screen separated from the liquid mold material 20 after such tempering. In the event that the tempering tempering temperature is insufficiently high to re-liquify the mold material, the solid mold material can be dissolved away by any suitable solvent or etchant which does not effect the metal spheres. Also, residual films of the mold material which remains on the surface of such spheres, after screen separation from the liquid mold material, can be so removed. Considerable advantage accrues to the spheres which are heat treated in a matrix of solidified mold material 20. These include reduced heat treat distortion and elimination of surface deterioration of the spheres by heat treating atmospheres or media.

Due to the relatively high melting point of silver and the increased cost of using this metal, equivalent density liquid mold materials (used for stream casting such metals as iron, cobalt, nickel, and alloys thereof) are generally composed of lead alloyed with suitable alkali or alkaline earth metals. However, in the manufacture of precision ball bearings (particularly by the method depicted in FIG. 18) equivalent density liquid mold materials based on silver are preferred. This is especially true where the bearings are subsequently heat-treated while encased in the liquid and solidified mold material. Such preferment is due not only to the higher heat conductivity (and correspondingly better heat treat response) of liquid molds based on silver but, also, due to the ease with which such encasing and coating, solidified mold materials can be removed from the precision ball bearings without harm thereto. Matrixes of solid mold material, based on silver, can readily be dissolved away by boiling the bulk product in a hot aqueous solution of sodium cyanide. Such solutions are in no manner detrimental to the ball bearings contained therein.

With regard to the use of molten, de-watered hydroxides as liquid mold materials, they have not previously been considered as candidates for this function due to a prevalent misunderstanding as to their true nature. It is a general belief (held even by most chemists) that aluminum will dissolve in such fluid materials. This is based on the fact that sodium hydroxide solutions with water are used to chem-mill aluminum. Hot aqueous solutions of sodium hydroxide (and other alkali hydroxides) rapidly etch away massive volumes of solid aluminum and its alloys. Even in the case where molten sodium (or other) hydroxide is produced by melting solid pieces of sodium hydroxide (such as pellets, sticks, flakes or chucks which are the usual forms in which it is commercially available) in a crucible, solid or liquid aluminum (introduced into the molten bath) reacts vigorously therein. What is not realized is that the reaction, under these conditions, results from the water that is almost invariably dissolved in the molten bath. Actually, as the dissolved water is used up by continued reaction, the initially vigorous evolution of hydrogen gas slows up and finally ceases altogether. At this point, the molten hydroxide bath is effectively de-watered and aluminum may be introduced into the molten bath without any perceivable etching.

I have de-watered such molten hydroxide baths by the simple expedient of sweeping (stirring) the bath with a broom made up of bunched aluminum wires until all evolution of the hydrogen gas reaction product has ceased. Solid aluminum sheet was then immersed in the de-watered molten hydroxide bath and allowed to remain therein for some ten hours. On removal, no surface deterioration or etching was apparent. Subsequently, the temperature of the molten hydroxide bath was raised to 800° C. and the aluminum sheet was melted therein without reacting in any manner. It should be noted that, during this prolonged exposure of the aluminum to the de-watered molten hydroxide, a cover was kept over the crucible top so that most of the surrounding air (with its water vapor content) was essentially excluded. This is a necessary precaution since molten hydroxides readily absorb water vapor from the air.

It has thus been repeatedly proven that molten hydroxides (in the de-watered condition) are entirely compatible for use as liquid mold materials for such metals as magnesium, aluminum, copper and the like. They have the virtues of low melting points, relatively high boiling points, and excellent fluidity as well as acceptable thermal properties.

One other presumed drawback to these materials is their detrimental effect on metals known as caustic-embrittlement. Such embrittlement is caused by the dissolved water in the hydroxides and is non-existent where de-watered molten hydroxides are used. More than this, such molten hydroxides are easily de-watered and readily maintained in this condition by preventing access of the surrounding air.

Such molten and solidified hydroxides are readily removed from the surface of solidified structures, which have been stream-cast therewith or therein, by entirely conventional procedures. To illustrate this point, commercial hydride descaling of metals is done in a molten bath of sodium hydroxide. Subsequently, the metals treated therein are washed, neutralized, and rinsed without detrimental effect on the metals in any way.

As a matter of economics only, such liquid mold materials are limited to the relatively cheap sodium and potassium hydroxides. Lithium hydroxide and strontium hydroxides can also be used but these would be mixed with either sodium or potassium hydroxides or both to stabilize them and prevent their heat decomposition. Intermixtures of any two or all of the mentioned hydroxides can be utilized as liquid mold materials for the stream casting systems disclosed herein. The use of hydroxides (singly or as mixtures) as liquid mold materials is entirely novel.

Molten hydroxides and molten salts (and mixtures thereof), along with intentional additions of water, can also be utilized as liquid mold materials for the stream casting of metals (such as iron, silver, nickel, etc.) which are essentially non-reactive to the water therein. Also, in those systems wherein the stream-cast metals solidify with great rapidity (as in stream casting of fairly thin structures within the body of a cold liquid mold material), a number of metals (reactive with the dissolved water in these liquid mold materials) can be effectively processed. In these cases, the encompassing and/or coating liquid mold material must be removed immediately to prevent etching of the structure or embrittlement thereof due to such reaction. The desired amount of water can be readily added to such liquid mold materials by passing live steam through the body of the molten liquid while contained in a suitable crucible. Also, the water concentration can readily be measured by use of a suitably refractory hydrometer.

With respect to stream casting, the common structural metals (magnesium, aluminum, copper, steel, nickel and cobalt) will be used to illustrate the processes with respect to metals. It will be understood that many other metals (as beryllium, silver, etc.), and alloys of many of the metals, can be advantageously stream cast by the methods disclosed herein. Also, with respect to the stream casting directions (vertically downward, slantwise downward, horizontal, slantwise upward, and vertically upward) only three such (vertically downward, horizontal and vertically upward) will be discussed for illustrative purposes since, in most (but not all) of the systems disclosed herein, the slantwise and horizontal directions of stream casting require liquid mold materials having a density equivalent to that of the molten metal being streamed and can, therefore, be grouped as a general horizontal direction.

In the following description discussions, the preferred directions of stream casting will be adhered to, it being understood that the preferred direction is not limiting. For example, it is preferred to stream cast a heavier molten metal vertically downward in a less-dense, or equivalent density, liquid mold material. Likewise, it is preferred to stream cast a lighter molten metal vertically upward in a denser, or equivalent density, liquid mold material. This is due to the fact that denser molten metals tend to sink within a less-dense liquid mold material, and less-dense molten metals tend to float upward in a denser liquid mold material. When streamed in the preferred direction, this sinking or floating tendency is not harmful since a solidified form-retaining skin forms on the surface of the streamed molten metal prior to the sink or float tendency becoming predominant. This same skin forms on the molten metal structure's surface if stream casting is done in the non-preferred direction; however, where the preferred direction of stream casting is used, this skin is stretched out along the axis of the structure and retains its smooth longitudinally straight shape. Where stream casting is done in the non-preferred direction, any sinking of floating tends to longitudinally collapse (bulge out) the thin skin during its incipient formation. Due to this deforming action, it is sometimes difficult (but not impossible) to stream cast longitudinal structures in the non-preferred direction without producing a wavy or folded surface on the final product.

As an illustrative example of the foregoing, magnism (density=1.74 g./cc.) can be vertically downstream cast in an encompassing liquid mold of sodium (density=0.97 g./cc.) with great facility. Magnesium can also be vertically upstream cast to give a simulated structure; however, it is only under special circumstances or systems that circumferential folds, laps, or wrinkles on the surface of the longitudinal shape, so produced, can be avoided. One such special system (where such folding or lapping of the surface does not take place during vertical upstream casting of molten magnesium in a liquid mold of sodium) is that depicted by FIG. 12 wherein a relatively cold liquid mold of sodium, moving at a much greater rate of speed than the streamed structure of molten magnesium, is used. As explained in the disclosure of the system depicted by FIG. 12 for a cold liquid mold material, this pulling-out feature prevents such folding and bulging of the longitudinal structures surface in all molten metal-cold liquid phases. Even where the system depicted by FIG. 12 utilizes a hot liquid mold material, the thin structure so stream cast is almost invariably straight and true and exhibits an excellent surface.

Stream casting in the non-preferred direction is oftentimes possible and feasible. However, as the disparity between the densities (of the liquid mold material and the molten metal being so cast) becomes greater, the difficulties are also magnified. As previously stated in prior sections of this disclosure, such compounds as hydroxides, molten salts, water, glycerine, liquid silicones, Dow-therm-A, and a number of other organics can be used as liquid mold materials either by themselves or as mixtures (preferably as eutectic mixtures such as 50—50 weight percent of potassium and sodium chloride, etc.) for one or more of the stream casting systems herein disclosed.

Also, such compounds (with particular emphasis on single category materials, such as molten salts) can be so mixed (using heavier and lighter compounds of the same category) that they form liquid mold materials which have an equivalent density to the molten metal being stream cast therein. It should be noted that such equivalent density liquid mold materials are unique and novel and not previously used in any of the prior art. They are therefore claimed as novel additions to the art of liquid mold casting when used in conjunction with the stream casting systems disclosed herein.

Emphasis will hereafter be placed on liquid mold materials composed of relatively low melting point metals, and mixtures thereof, which can be used to advantage with the methods disclosed herein. As with the molten metals to be stream cast by the system herein disclosed, only the most common of these relatively low melting point metals will be used for illustrative purposes, it being understood that such illustrative examples are not limiting to the disclosure and that many other phases exist which fulfill the requirements of the stream casting process. This is especially true with respect to combination metallic liquid mold materials having a density equivalent to that of the molten metal being stream cast by the methods herein disclosed. Such equivalent density metallic liquid mold materials are unique and novel and have not been used in any of the prior art. They are therefore to be claimed as novel additions to the art of casting by use of liquid molds when used in conjunction with the stream casting systems disclosed herein.

Now, then, with reference to preferred liquid mold materials for stream casting vertically downwards, magnesium and aluminum can be so cast using liquid mold materials such as sodium, potassium, or mixtures thereof, as well as with equivalent density liquid mold materials to be disclosed under horizontal casting.

It will be understood hereinafter that all mentioned equivalent density liquid mold materials will be illustrated under horizontal stream casting and that horizontal stream casting also includes stream casting at a slant to the horizontal.

Iron, nickel, and cobalt (and alloys thereof) can be stream cast vertically downwardly in a liquid mold of barium and less dense or equally dense alloys of barium with lead and silver. Also, for thinner structures, such molten metals can be stream cast vertically downwardly in liquid molds of calcium, strontium or lithium or combinations of these (among themselves or with barium). Also combinations of these lighter metals with lead or silver, wherein the preferred alloys are less dense or of equivalent density to that of the molten metal being so stream cast.

For stream casting vertically upwards, aluminum can be streamed in liquid molds of lead, bismuth, cadmium, indium and alloys of lead, bismuth, cadmium, indium and/or tin with sodium, it being preferred that the density of such alloys be equivalent to, or greater than, the density of the molten aluminum being so cast.

Copper can be stream cast vertically upwards in a liquid mold of lead or equivalent or greater density alloys of lead with sodium and/or lithium.

Iron, nickel and cobalt (and alloys thereof) can be stream cast vertically upwards in liquid molds of lead, silver, or combination thereof. Such molten metals (steel, etc.) can also be so stream cast in denser, or equivalent density, alloys of lead and/or silver with the alkaline earth metals (barium, calcium, strontium) and lithium or combinations thereof.

For stream casting horizontally (or at a slant to the horizontal), equivalent, or nearly equivalent, density alloys must be used.

For the horizontal stream casting of aluminum, such alloys can be composed of lead, bismuth, cadmium, indium and/or tin with sodium in any equivalent density combination.

For the horizontal stream casting of copper, such alloys can be composed of lead with sodium and/or lithium.

For the horizontal stream casting of iron, nickel or cobalt (and alloys thereof), such liquid mold alloys can be composed of lead and/or silver in combination with barium, strontium, calcium and lithium. All intercombinations of these metals having equivalent density to the metals (as steels, etc.) being stream cast can also be utilized.

THE METALLURICAL DESIGN OF EQUIPMENT DENSITY LIQUID MOLD MATERIALS

Equivalent density liquid mold materials (of metallic composition) are generally composed of a denser, relatively-low-melting metal (such as silver, lead, bismuth, cadmium, indium, tin, etc.) and a less dense, relatively-low-melting metal such as the alkali or alkaline earth metals. For all such liquid mold phases, there are many combinations and permutations of these heavy and light metals (as alloying constituents) which can effectively be utilized for stream casting by the methods and systems disclosed herein.

In actuality, truly equivalent liquid mold materials cannot be precisely calculated from the physical data now obtainable from metallurgical and scientific compendiums. Such data is mostly non-existent or, if it exists at all is limited to liquid coolants used in systems for the production of atomic energy. As such, the information does not seem to be available to the general public. For example, none of the phase diagrams for the various binary and ternary metallic phase system show a boiling point curve and such information is both limiting and pertinent to the design of equivalent density liquid mold systems. More important, the elevated temperature densities of the molten metals used for such design is in no manner available. Even less available is elevated temperature density data for the alloy phases best utilized as liquid molds for the processes herein described.

Regardless of these limitations and restrictions, the metallurgical design of such metallic, equivalent-density liquid mold phases can be approached, on a practical basis, by basing such calculations on the density data available for the elemental materials at standard temperature. By use of this approximate method, liquid mold alloys having a density roughly equivalent to that of the molten metal, to be stream cast therein, can be designed. Once such alloys have been synthesized by melting the calculated amounts of metallic constituents together, they can readily be adjusted to the desired near-equivalent-density by practical experiments or in actual production processing. Once it has been determined that such a metallic, liquid mold material is less dense than required, it is a simple matter to make discrete additions of the denser alloying constituent of the liquid mold phase until the density has increased to the proper level. In like manner, when it has been determined that such a metallic, liquid mold phase is overly dense (for the molten metal being stream cast therein), discrete additions of the lighter allowing constituent of the liquid mold phase can be made to adjust the density to the proper level.

The following table is illustrative of such approximately equivalent density liquid mold alloy phases which have been calculated from the given densities of the solid constituents. The melting points listed have been taken from the available phase diagrams for the alloy composition shown. Where no phase diagram was available, the melting points have been estimated as indicated.

TABLE SHOWING ILLUSTRATIVE LIQUID MOLD ALLOYS WITH WEIGHT PERCENT COMPOSITION APPROXIMATELY EQUIVALENT TO THAT OF METAL TO BE STREAM CAST

| Metal to be stream cast and density (g./cc.) | Approximate equivalent density liquid mold alloy used | Weight Percent of lighter constituent in the alloy | Approximate melting point of equivalent density alloy, ° C. |
| --- | --- | --- | --- |
| Aluminum (2.7) | Pb-Na | 30 Na | 380 |
|  | Sn-Na | 26 Na | *300 |
|  | In-Na | 26 Na | *150 |
| Copper (8.96) | Pb-Na | 2.4 Na | 320 |
|  | Pb-Li | 1.3 Li | 350 |
| Steel, assumed density of (7.5). | Pb-Li | 2.45 Li | 480 |
|  | Pb-Ca | 8.0 Ca | 650 |
|  | Pb-Sr | 15.3 Sr | *620 |
|  | Pb-Ba | 22.8 Ba | 590 |
|  | Ag-Li | 2.1 Li | 750 |
|  | Ag-Mg | 7.9 Mg | 810 |
|  | Ag-Ca | 6.8 Ca | *980 |
|  | Ag-Sr | 13.3 Sr | *970 |
|  | Ag-Ba | 20.0 Ba | *930 |

*Estimated.

NOTE.—Liquid mold materials composed of alkali or alkaline earth metals or alloys of these metals with other metals (see above table) must be protected from oxidizing or hydrolyzing effects of the surrounding atmosphere. This is usually accomplished by means of an enclosing shroud containing a dry, inert gas (as nitrogen) under a slight positive pressure as illustrated in Fig. 15 (at outlet end).

An examination of the mechanics of equivalent density liquid molds will reveal that a truly equivalent density, between the liquid mold material and the molten metal being streamcast, can only occur at one specific point along the axis of the stream casting system. It is preferred that this density point coincide with the area of the stream cast structure where solidification has just started but this is not mandatory to proper operation of such systems since a wide latitude is available. In horizontal streamcasting, using an equivalent density liquid mold, the much hotter molten metal, to be stream cast, has less density (as it exits from the streaming-nozzle) than the encompassing colder liquid mold material. Due to this difference in density, the lighter molten metal has a tendency to float upward in the body of the liquid mold material as it flows downstream. At this point, there is a slight bowing upward of the molten, longitudinal structure. As heat is abstracted from the molten metal structure and transferred to the liquid mold material, the densities of the structure and mold approach each other until they actually become practically equivalent at some downstream point. Further downstream, the even more dense, solidified, stream cast structure tends to sink in the liquid mold material. In order to allow for this float-sink tendency, as the stream cast structure flows down the horizontal containing conduit, the conduit can be made oval or of a rectangular cross-section with the longer axis of the conduits cross-section in the vertical direction. In this manner, a considerable amount of rising and falling of the structure as it moves downstream is permissible. A definition of an equivalent density liquid mold material could well be predicated on the ability of the liquid mold material to consumate the horizontal processing of the molten metal structure stream cast therein.

Many equivalent density liquid mold materials are composed of one or more metals which have lower boiling points than the melting point of the metal being stream cast therein. Such low boiling point metals are alloyed (in most cases) with major amounts of another alloying element which has a boiling point that is higher than the melting point of the molten metal structure being processed. Examples of such alloys are the silver 2.1 weight percent lithium alloy and the lead 2.45 weight percent lithium alloy shown in the table illustrating the approximate compositions of calculated equivalent density liquid mold materials. When used as adjustable equivalent density liquid molds, for the stream casting of steel, the steaming temperature of the steel is higher than the boiling point of the lithium metal in the equivalent density liquid mold material. The other alloying element effectively suppresses the boiling tendency of the lithium. Even in solutions of ethyl alcohol and water, distillation of the last (lower percentages) of alcohol out of the water-alcohol system is extremely difficult. The phase diagram for magnesium and silicon illustrates this point exceptionally well.

Pure magnesium boils at 1110° C.; however, an alloy of silicon 10 weight percent magnesium is stable at temperatures some 250° C. higher than the boiling point of pure magnesium.

A point that should be emphasized is that longitudinal structural products, of the stream casting systems herein disclosed, tend to have rounded corners and edges due to the action of surface tension. Due to this tendency to be out-of-shape cross-sectionally, such products are generally used as preforms for subsequent rolling or draw-die processes. Such subsequent mechanical working also refines the grain of the structure. Structures having relatively simple cross-sectional shapes (as wire and sheet) do not necessarily require such mechanical working. Thin structures are remarkably fine grained and drawing-out (thinning down) of such structures, in the molten and solidifying state, enhances their longitudinal strengths.

Whereas the primary commercial applications of the stream casting processes disclosed herein are primarily concerned with the cast-forming of structural items of metals, the process is equally applicable to the cast-forming of inorganic nonmetallic materials which exhibit a castable nature. Such materials encompass the following: glasses, oxides, carbides, nitrides, silicides, borides, phosphides, sulphides, and combinations thereof. Whereas all of the group listed are not of a castable nature, every one of the groups contains one or more compound(s) which is castable either by itself or in combination with one or more compound(s) of the other groups. By use of liquid mold materials comprising the metals of the group lead, silver, tin, copper, cobalt, nickel and the noble metals, or alloy combinations thereof, each and every one of the castable inorganic nonmetallic materials can be stream cast in a compatible liquid mold material, i.e., one that is substantially nonreactive to and immiscible with the inorganic nonmetallic material being stream cast therein.

It should be noted that whereas the liquid mold materials listed are all of a relatively high boiling nature, the material to be stream cast therein can exhibit a casting temperature which is far higher than the boiling point of the liquid mold material within the body of which it is stream cast. The only criterion being that the liquid mold material used would have a substantially higher rate of heat conductivity than that of the material being stream cast and that there is a sufficient amount of liquid mold material to absorb all of the heat of the castable material prior to attaining the boiling point (of the liquid mold material) or that heat is transferred away from the liquid mold material through the containing conduit wall to prevent attainment of the boiling point temperature. It should further be noted that all of the stream casting processes disclosed herein are applicable to the cast-forming of structural shapes (such as fibers, sheets, tubes, etc.) of inorganic nonmetallic materials, and are so claimed, wherein the castable material is stream cast within the body (encompassed by) of the liquid mold material. Obvious, however, is the exclusion of the process variation wherein the castable material is streamed into an equally hot liquid mold material wherein it is subsequently cooled to its solidification temperature within and along with the liquid mold material. In this instance, the liquid mold material must have a boiling point which is higher than the casting temperature of the inorganic nonmetallic material being stream cast therein and, in these instances, the processing of such castable material by stream casting the material within the body of a hot liquid mold material (having a boiling point that is higher than the casting (pouring) temperature of the castable material) is also claimed as new.

In start-up of such stream casting operations, conventional techniques (such as the use of a preformed starter blank) are used. The use of such starter blanks has been detailed in my prior patent disclosure identified above.

I claim:

1. A method for stream casting planar shapes such as foil, sheet, plate and the like, wherein a planar stream of molten casting metal to be solidified in part to a planar structure is floated on top of, and moved synchronously along with and in contact with the surface of a body of denser cooling liquid mold material in a laminar flow that minimizes any shearing action at the liquid mold-molten metal interface, and at a temperature of said liquid mold material lower than that of the casting metal so as to abstract heat therefrom, whereby a planar layer of solidified metal is formed between a remaining upper body of molten metal and the lower supporting body of cooling liquid mold material and exits from the system as a solidified planar structure, and wherein said remaining molten metal is by-passed and reintroduced, along with a suitable amount of new molten metal for make-up, at the starting end of the system while the denser liquid mold material is by-passed through a cooling area and subsequently reintroduced at the starting end of the system.

2. A method of horizontally stream casting planar structural shapes comprising: flowing a stream of molten metal to be solidified to the desired structure in contact with the surface of a cooling liquid mold material while both the molten metal being stream cast and the liquid mold material flow in the same direction and at a substantially synchronous rate of laminar flow that minimizes any shearing action at the liquid mold-molten metal interface, said liquid mold material being less dense and floated on top of a body of denser molten metal to be solidified in part to a planar structure, while the two bodies are moving in a synchronous manner, so that a body of solidified metal is formed between the lower body of molten metal and the upper body of cooling liquid mold material and exits from the system as a solidified planar structure, said remaining molten metal being by-passed and reintroduced at the starting end of the system along with a suitable amount of new molten metal for make-up purposes while the less dense liquid mold material is by-passed through a cooling area and subsequently reintroduced at the starting end of the system.

3. A method of stream casting tubing, said method comprising: flowing molten casting metal from an orifice having an annular cross-sectional shape, vertically upwardly from a streaming nozzle having said orifice, into and along with encompassing internal and external streams of cool liquid mold material flowing in approximate synchronization therewith, said mold material having a density equivalent to or greater than that of the molten metal being so stream cast, said liquid mold material being utilized for removing heat from said structure to cause its solidification.

4. A method of stream casting thin longitudinal structural shapes such as relatively thin wire, foil, and the like by flowing a stream of molten metal to be solidified to the desired structure, from a streaming nozzle having an orifice of the selected cross-sectional shape into and along with an encompassing stream of hot liquid mold material at a temperature at least as high as that of the molten metal being so stream cast flowing in approximate synchronization therewith, in a laminar flow that minimizes any shearing action at the liquid mold-molten metal interface gradually belling down the cross-section of the hot encompassing liquid mold material until the cross-section of the molten metal stream therein is reduced to a selected thinness, and then subjecting the streaming mold material and molten metal to cooling by a water jacket which abstracts heat from and effectively solidifies the thin structure contained within the body of the still liquid mold material.

References Cited

UNITED STATES PATENTS

| | | | |
|---|---|---|---|
| 2,363,695 | 11/1944 | Ruppick | 164—81 |
| 2,617,148 | 11/1952 | Ryan. | |
| 2,627,084 | 2/1953 | Ryan. | |
| 2,754,559 | 7/1956 | Fromson | 164—81 |
| 3,128,513 | 4/1964 | Charlton et al. | 164—89 |
| 3,321,008 | 5/1967 | Jones | 164—280 X |
| 3,347,959 | 10/1967 | Engelke et al. | 164—89 X |
| 3,096,083 | 7/1963 | Keon | 263—2 |

FOREIGN PATENTS 52,095   4/1943   France.

J. SPENCER OVERHOLSER, *Primary Examiner.*

R. SPENCER ANNEAR, *Assistant Examiner.*

U.S. Cl. X.R.

264—166, 298